United States Patent
Sera et al.

(10) Patent No.: US 11,634,056 B2
(45) Date of Patent: Apr. 25, 2023

(54) VEHICLE SEAT

(71) Applicant: TOYOTA BOSHOKU KABUSHIKI KAISHA, Aichi-ken (JP)

(72) Inventors: Hidefumi Sera, Aichi-ken (JP); Shun Fujishiro, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 17/358,803

(22) Filed: Jun. 25, 2021

(65) Prior Publication Data
US 2021/0402904 A1 Dec. 30, 2021

(30) Foreign Application Priority Data
Jun. 30, 2020 (JP) ............................. JP2020-112592

(51) Int. Cl.
*B60N 2/90* (2018.01)
*B60N 2/30* (2006.01)

(52) U.S. Cl.
CPC ............ *B60N 2/995* (2018.02); *B60N 2/3011* (2013.01); *B60N 2/3047* (2013.01); *B60N 2/3088* (2013.01)

(58) Field of Classification Search
CPC .... B60N 2/995; B60N 2/3011; B60N 2/3047; B60N 2/3088; B60N 2/304; B60N 2/3045; B60N 2/62; A47C 7/506; A47C 7/5062; A47C 7/5064; A47C 7/5066; A47C 7/5068

USPC ...... 297/423.26, 426.28, 423.3, 284.11, 311, 297/335, 332, 334, 378.12, 378.14
See application file for complete search history.

(56) References Cited

U.S. PATENT DOCUMENTS

| | | | |
|---|---|---|---|
| 10,336,220 B2 * | 7/2019 | Sera ....................... | B60N 2/995 |
| 10,604,036 B2 * | 3/2020 | Kimura ................. | B60N 2/3045 |
| 2017/0341543 A1 * | 11/2017 | Fujisawa .............. | B60N 2/3045 |
| 2018/0339628 A1 * | 11/2018 | Kimura ................. | B60N 2/3047 |
| 2018/0339629 A1 * | 11/2018 | Kimura ................. | B60N 2/995 |

FOREIGN PATENT DOCUMENTS

| JP | 2008049066 | * | 3/2008 |
|---|---|---|---|
| JP | 2013-112128 | | 6/2013 |

* cited by examiner

*Primary Examiner* — Mark R Wendell
(74) *Attorney, Agent, or Firm* — Greenblum & Bernstein, P.L.C.

(57) ABSTRACT

A vehicle seat includes a conjunction mechanism and a locking mechanism. When a seat cushion is placed at a raised position, the conjunction mechanism causes an ottoman to be placed at a stored position closer to the seating surface relative to a standby position. The locking mechanism restricts movement of the ottoman when the seat cushion is placed at a seating position. The locking mechanism includes an anchoring portion, a traction cable, and a wound portion. In response to a change being made in an amount of winding of the traction cable around the wound portion due to the seat cushion being moved, anchoring of the ottoman by the anchoring portion and canceling of the anchoring are caused.

8 Claims, 14 Drawing Sheets

VEHICLE SEAT

This nonprovisional application is based on Japanese Patent Application No. 2020-112592 filed on Jun. 30, 2020 with the Japan Patent Office, the entire contents of which are hereby incorporated by reference.

BACKGROUND OF THE INVENTION

Field of the Invention

The present disclosure relates to a vehicle seat, in particular, a vehicle seat installed in a vehicle such as an automobile.

Description of the Background Art

Conventionally, vehicle seats having various configurations have been proposed. As one of such vehicle seats, a vehicle seat provided with an ottoman has been known. The ottoman is assembled to a front end portion of a seat cushion to function as a leg rest (i.e., a stage on which legs are placed) that supports the legs of an occupant. Normally, the ottoman has an expanding mechanism to change the shape of the ottoman or move the ottoman between a retracted state and an expanded state. By changing the shape of the ottoman or moving the ottoman into the expanded state only when needed, the ottoman is used as a leg rest.

There is a vehicle seat that is provided with this type of ottoman and that is further provided with a tip-up mechanism to flip up a front end portion of a seat cushion in order to realize a walk-in function and a luggage compartment expansion function. In the vehicle seat, the ottoman is configured to be drawn to the seat cushion side as much as possible to attain a more compact outer shape of the vehicle seat in a state in which the front end portion of the seat cushion is flipped up (i.e., at the time of tip-up).

Such a vehicle seat is disclosed in, for example, Japanese Patent Laying-Open No. 2013-112128. In the vehicle seat disclosed in the patent publication, the ottoman is pivotably assembled to the seat cushion. When the ottoman in the retracted state is pivoted relative to the seat cushion, the expanded state is realized.

It should be noted that in the vehicle seat disclosed in the above patent publication, the ottoman is provided with a latch mechanism, and is always biased to the retracted position side by a torsion coil spring serving as an biasing spring. Thus, when the seat cushion is placed at the seating position, the retracted state of the ottoman is maintained by the biasing spring unless a particular manipulation is performed.

SUMMARY OF THE INVENTION

However, in the case where the ottoman is configured to be drawn to the seat cushion side to attain a more compact outer shape of the ottoman at the time of tip-up in the vehicle seat configured to realize the expanded state of the ottoman by changing the shape of the ottoman itself instead of pivoting the ottoman as described above, it is necessary to configure the vehicle seat such that the ottoman is movably assembled to the seat cushion and relative movement of the ottoman with respect to the seat cushion is restricted in a state in which the seat cushion is placed at the seating position. If such restriction is not provided, stable operation of the ottoman is hindered.

In this case, it is preferable to provide some locking mechanism to restrict the relative movement of the ottoman with respect to the seat cushion. However, this type of locking mechanism generally tends to result in increased occupation volume and complicated configuration thereof. Therefore, from a viewpoint of design, it is often difficult to provide such a locking mechanism in the vicinity of the ottoman.

Thus, the present disclosure has been made to solve such a problem, and has an object to realize compact retraction of an ottoman at the time of tip-up and stable operation of the ottoman at the time of seating while preventing increased size and complication of a vehicle seat configured to realize an expanded state of the ottoman by changing the shape of the ottoman itself.

A vehicle seat according to a certain aspect of the present disclosure includes a base portion, a seat cushion, and an ottoman. The base portion is installed on a floor of a vehicle. The seat cushion is provided on the base portion and has a seating surface. The ottoman is provided at a front end portion of the seat cushion and has a leg rest surface. The seat cushion is movable relative to the base portion between a seating position and a raised position, the seating position being a position at which the seat cushion allows for seating by the seating surface facing upward, the raised position being a position at which the seat cushion is raised by the front end portion of the seat cushion being flipped up from the seating position. The ottoman is changeable in shape between a retracted state and an expanded state, the retracted state being a state in which the ottoman is retracted by the ottoman being located on a side opposite to a side on which the seating surface is located when viewed from the seat cushion, the expanded state being a state in which the ottoman is expanded to protrude from the front end portion of the seat cushion by a tip portion of the ottoman being flipped up from the retracted state. The leg rest surface is provided to face upward when the seat cushion is placed at the seating position and the ottoman is in the expanded state. The vehicle seat according to the certain aspect of the present disclosure further includes a conjunction mechanism and a locking mechanism. The conjunction mechanism places the ottoman at a standby position when the seat cushion is placed at the seating position and the ottoman is in the retracted state, and changes a relative position of the ottoman with respect to the seat cushion in conjunction with movement of the seat cushion so as to place the ottoman at a stored position when the seat cushion is placed at the raised position, the stored position being a position closer to the seating surface relative to the standby position. The locking mechanism permits relative movement of the ottoman with respect to the seat cushion when the seat cushion is not placed at the seating position, and restricts the relative movement of the ottoman with respect to the seat cushion when the seat cushion is placed at the seating position. The locking mechanism has an anchoring portion for anchoring the ottoman, a traction cable that has one end connected to the anchoring portion and that has the other end fixed to the base portion, and a wound portion provided with a peripheral surface around which the traction cable is wound. In the vehicle seat according to the certain aspect of the present disclosure, the locking mechanism is configured to cause anchoring of the ottoman by the anchoring portion and canceling of the anchoring in response to a change being made in an amount of winding of the traction cable around the wound portion when the seat cushion is moved relative to the base portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
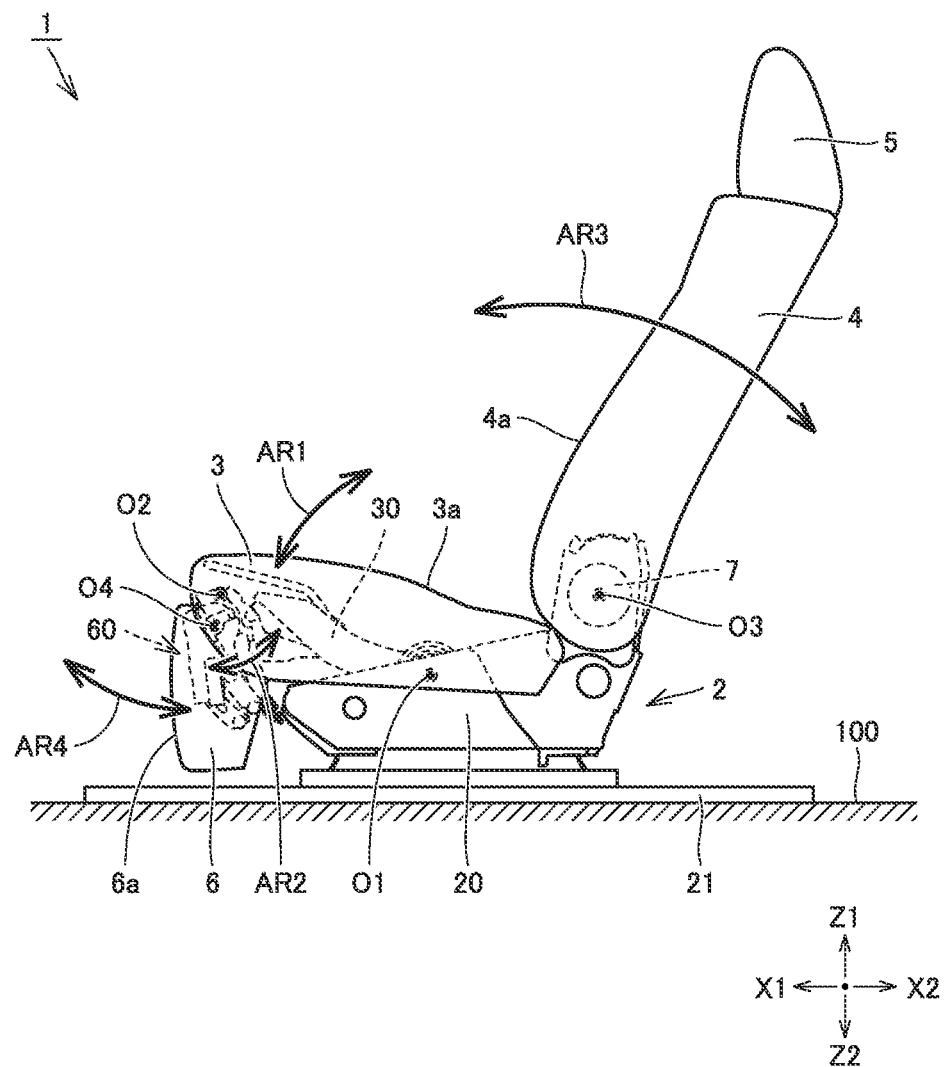
FIG. 1 is a schematic side view showing a first used state of a vehicle seat according to an embodiment.

Hereinafter, an embodiment will be described in detail with reference to the figures. The embodiment below illustratively describes a case where a characteristic configuration of the present disclosure is applied to a vehicle seat configured as a seat of an automobile. It should be noted that in the embodiment below, the same or common portions are denoted by the same reference characters and will not be described repeatedly.

In each of the figures, when viewed from an occupant seated on a vehicle seat, a seat forward direction and a seat rearward direction are respectively indicated by an X1 direction and an X2 direction, a seat leftward direction and a seat rightward direction are respectively indicated by a Y1 direction and a Y2 direction, and a seat upward direction and a seat downward direction are respectively indicated by a Z1 direction and a Z2 direction. In the description below, an axis that matches with seat forward direction X1 and seat rearward direction X2 is referred to as an X axis, an axis that matches with seat leftward direction Y1 and seat rightward direction Y2 is referred to as a Y axis, and an axis that matches with seat upward direction Z1 and seat downward direction Z2 is referred to as a Z axis. It should be noted that a seat width direction matches with the extending direction of the Y axis.

Figure 2:
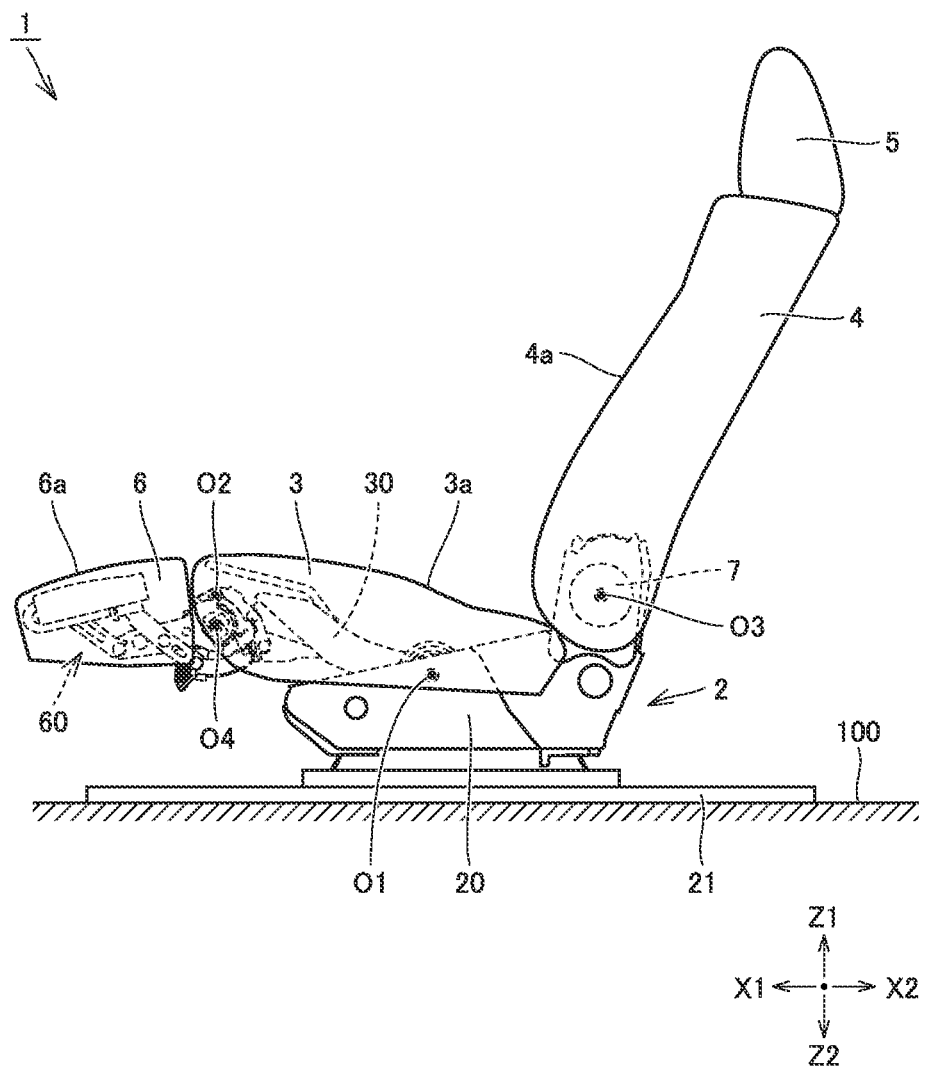
FIG. 2 is a schematic side view showing a second used state of the vehicle seat according to the embodiment.
Figure 3:
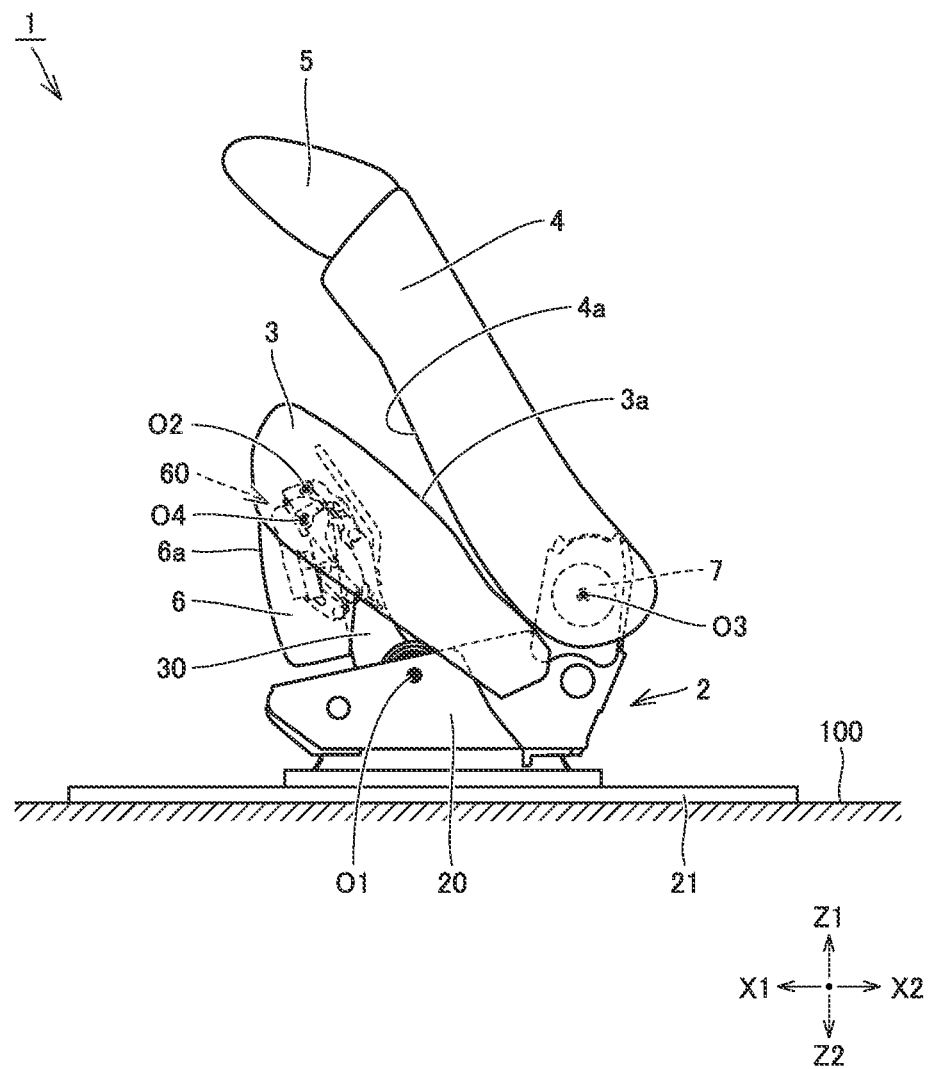
FIG. 3 is a schematic side view showing an unused/stored state of the vehicle seat according to the embodiment.

FIGS. 1 to 3 are schematic side views respectively showing a first used state, a second used state, and a unused/stored state of the vehicle seat according to the embodiment. First, referring to FIGS. 1 to 3, the following describes a schematic configuration and the above-described various states of a vehicle seat 1 according to the present embodiment.

As shown in FIGS. 1 to 3, vehicle seat 1 is installed on a floor 100 of a vehicle, and mainly includes a base portion 2, a seat cushion 3, a seat back 4, a head rest 5, and an ottoman 6.

Seat cushion 3 and seat back 4 are provided on base portion 2 serving as a base of vehicle seat 1. More specifically, seat cushion 3 is disposed above a portion of base portion 2 other than the rear end portion thereof, and seat back 4 is provided to stand upward from the rear end portion of base portion 2. On the other hand, head rest 5 is provided at the upper end portion of seat back 4, and ottoman 6 is provided at the front end portion of seat cushion 3.

The first used state shown in FIG. 1 represents a manner of use when an occupant is seated on vehicle seat 1 without using ottoman 6. In the first used state, seat cushion 3 is placed at a seating position described later in detail, and seat back 4 is placed at aback rest position described later in detail. Further, ottoman 6 is in a retracted state described later in detail. Particularly in the first used state, ottoman 6 is placed at a standby position described later in detail.

The second used state shown in FIG. 2 represents a manner of use when the occupant is seated on vehicle seat 1 while using ottoman 6. In the second used state, seat cushion 3 is placed at the seating position as with the first used state, and seat back 4 is placed at the back rest position as with the first used state. Ottoman 6 is in an expanded state described later in detail.

The unused/stored state shown in FIG. 3 represents a manner of use in which vehicle seat 1 is collapsed to exhibit a walk-in function and a luggage compartment expansion function. In the unused/stored state, the occupant is unable to be seated thereon, but the outer shape of vehicle seat 1 can be very compact. In the unused/stored state, seat cushion 3 is placed at a raised position described later in detail, and seat back 4 is placed at an inclined position described later in detail. Ottoman 6 is in the retracted state as with the first used state. Particularly in the unused/stored state, ottoman 6 is placed at a stored position described later in detail.

Switching among the first used state, the second used state, and the unused/stored state can be realized by performing manipulation through a manipulation portion (a manipulation lever, a manipulation button, or the like) (not shown), or by pushing seat cushion 3, seat back 4, or ottoman 6 in a predetermined direction while manipulating the manipulation portion.

Here, vehicle seat 1 according to the present embodiment is configured to restrict relative movement of ottoman 6 with respect to seat cushion 3 in the first and second used states that are manners of use in each of which seat cushion 3 is placed at the seating position, and is configured to permit the relative movement of ottoman 6 with respect to the seat cushion in the manner of use in which seat cushion 3 is not placed at the seating position (this manner of use includes not only the unused/stored state described above, but also a state during switching from the first used state to the unused/stored state and a state during switching from the unused/stored state to the first used state).

With such a configuration, in each of the first used state and the second used state, the relative position of ottoman 6 (more precisely, base links 63La, 63Ra pivotably assembled to below-described fixing brackets 61L, 61R, which are portions of ottoman 6 attached to seat cushion 3) with respect to seat cushion 3 is maintained, thereby realizing a stable operation (i.e., expanding operation and retracting operation) of ottoman 6.

On the other hand, in each of the unused/stored state, the state during switching from the first used state to the unused/stored state, and the state during switching from the unused/stored state to the first used state, the relative movement of ottoman 6 (more precisely, below-described base links 63La, 63Ra) with respect to the seat cushion is permitted, thereby realizing movement of ottoman 6 in conjunction with movement of seat cushion 3 by a conjunction mechanism 50 described later.

Therefore, in the unused/stored state in which the front end portion of seat cushion 3 is flipped up (i.e., during tip-up), ottoman 6 can be more drawn to the seat cushion 3 side due to an operation of below-described conjunction mechanism 50, thereby facilitating vehicle seat 1 to be compact as a whole. It should be noted that due to the movement in conjunction therewith, ottoman 6 is moved from the standby position to the stored position when switching from the first used state to the unused/stored state, whereas ottoman 6 is moved from the stored position to the standby position when switching from the unused/stored state to the first used state.

As shown in FIGS. 1 to 3, base portion 2 has: a base frame 20 that constitutes a skeleton of base portion 2; and a slide rail 21. Slide rail 21 is fixed to floor 100 of the vehicle, and base frame 20 is movably supported by slide rail 21 along the X axis direction. Thus, the whole of vehicle seat 1 other than slide rail 21 can be moved along the seat forward/rearward direction by manipulating the manipulation portion (not shown) or the like.

Seat cushion 3 has a seating surface 3a on which an occupant can be seated, and is disposed above the portion of base portion 2 other than the rear end portion thereof as described above. Seat cushion 3 mainly has: a tip-up frame 30 that constitutes a skeleton of seat cushion 3; a cushion pad that covers tip-up frame 30; and a cushion cover that covers the cushion pad to define seating surface 3a.

Seat cushion 3 is movably supported by base portion 2. Specifically, tip-up frame 30 is supported by base frame 20 so as to be pivotable in a direction of arrow AR1 shown in FIG. 1 with respect to a first pivotal axis O1 extending along the seat width direction. Thus, seat cushion 3 is movable relative to base portion 2 between the seating position shown in FIGS. 1 and 2 and the raised position shown in FIG. 3.

Seat back 4 has a back rest surface 4a against which an occupant can lean back, and is provided to stand upward from the rear end portion of base portion 2 as described above. Seat back 4 mainly has: a back frame (not shown) that constitutes a skeleton of seat back 4; a back pad that covers the back frame; and a back cover that covers the back pad to define back rest surface 4a.

Seat back 4 is movably supported by base portion 2. Specifically, the back frame is supported by base frame 20 so as to be pivotable in a direction of arrow AR3 shown in FIG. 1 with respect to a third pivotal axis O3 extending along the seat width direction. Thus, seat back 4 is movable relative to base portion 2 between the back rest position shown in FIGS. 1 and 2 and the inclined position shown in FIG. 3.

Here, a recliner 7 is provided at a coupling portion between base frame 20 and the back frame. By coupling base frame 20 and the back frame via recliner 7, the back frame is adjustable in its relative angle with respect to base frame 20. Thus, a back rest angle of seat back 4 can be adjusted by manipulating the manipulation portion (not shown) or the like.

Head rest 5 is provided at the upper end portion of seat back 4 as described above, and mainly has a head rest frame (not shown); a head rest pad that covers the head rest frame; and a head rest cover that covers the head rest pad. Head rest 5 is a portion with which the head of an occupant seated on vehicle seat 1 is supposed to be in abutment.

Ottoman 6 has a leg rest surface 6a on which the legs (particularly, calves) of the occupant can be placed, and is provided at the front end portion of seat cushion 3 as described above. Ottoman 6 mainly has: an ottoman frame 60 that constitutes a skeleton of ottoman 6; an ottoman pad that covers ottoman frame 60; and an ottoman cover that covers the ottoman pad to define leg rest surface 6a.

Ottoman 6 is movably supported by seat cushion 3. Specifically, ottoman frame 60 is supported by tip-up frame 30 so as to be pivotable in a direction of arrow AR2 shown in FIG. 1 with respect to a second pivotal axis O2 extending along the seat width direction. Thus, ottoman frame 60 is movable relative to seat cushion 3 between the standby position shown in FIG. 1 and the stored position shown in FIG. 3.

Further, ottoman frame 60 has a below-described expanding mechanism 62 (see FIG. 4 and the like), and can be extended and contracted with respect to a first reference axis O4 shown in the figure. In response to extension/contraction of expanding mechanism 62, ottoman 6 is changeable in shape between the retracted state shown in FIGS. 1 and 3 and the expanded state shown in FIG. 2. On this occasion, ottoman 6 is changed in shape to move leg rest surface 6a along a direction of arrow AR4 shown in FIG. 1.

Here, expanding mechanism 62 is provided with an angle adjusting mechanism 68 (see FIG. 4) described later. Angle adjusting mechanism 68 has a configuration similar to that of recliner 7 described above. By providing angle adjusting mechanism 68, a relative angle of leg rest surface 6a of ottoman 6 with respect to tip-up frame 30 can be adjusted. Thus, the angle of leg rest surface 6a of ottoman 6 can be adjusted by manipulating the manipulation portion (not shown) or the like.

Figure 4:
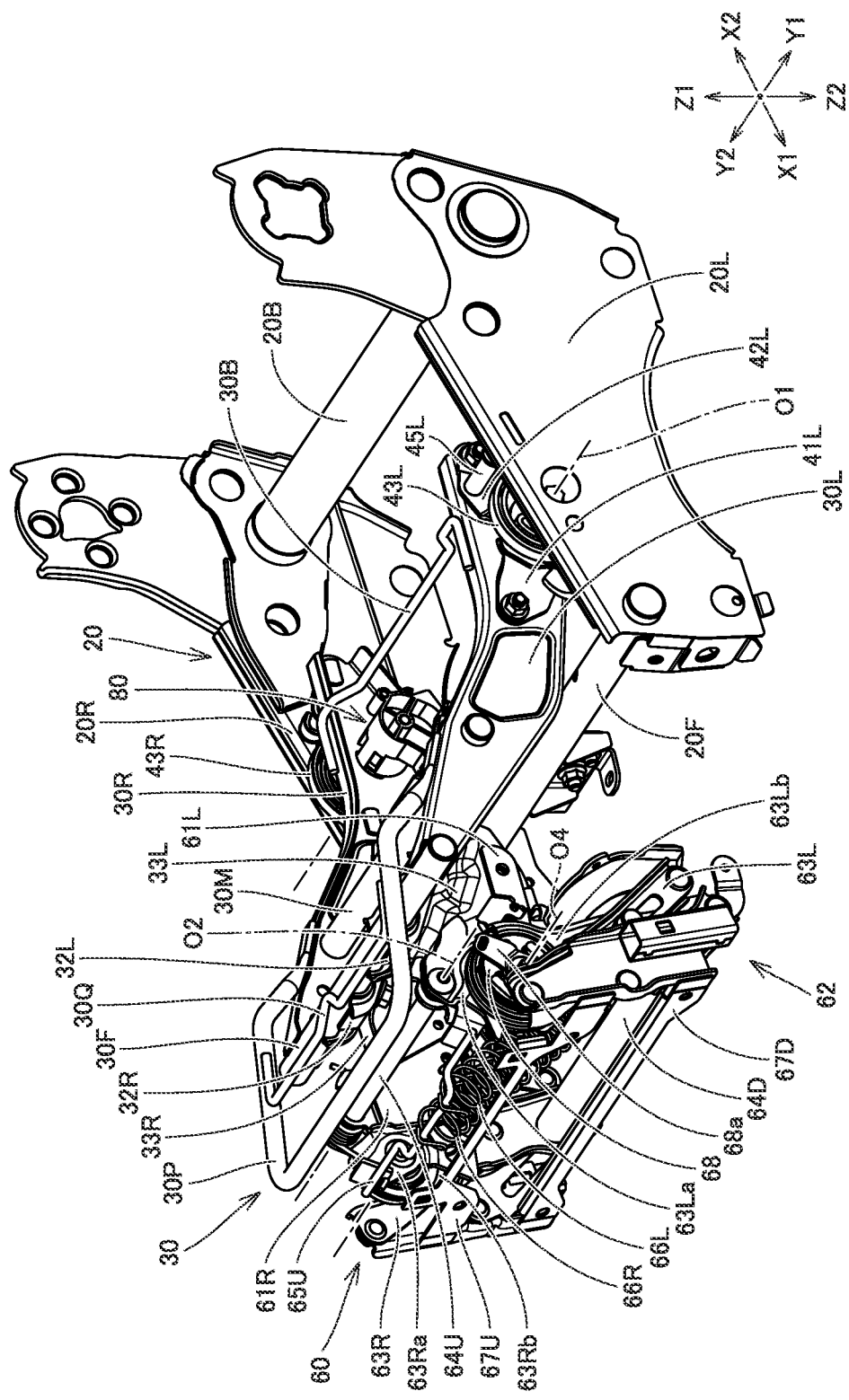
FIG. 4 is a schematic perspective view showing states of skeleton structures of a base portion, a seat cushion, and an ottoman in the first used state of the vehicle seat according to the embodiment.
Figure 5:
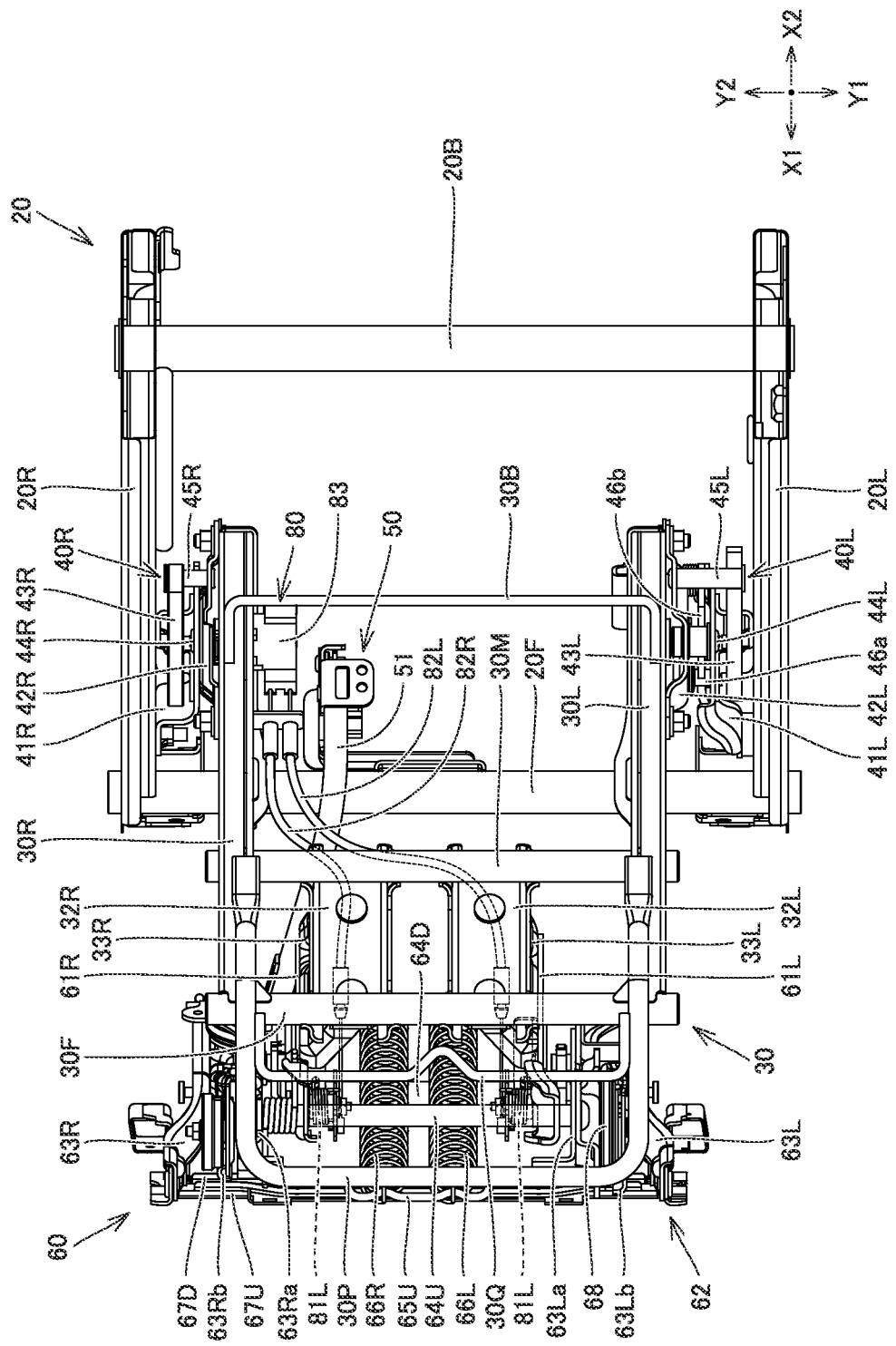
FIG. 5 is a schematic plan view showing the states of the skeleton structures of the base portion, the seat cushion, and the ottoman in the first used state of the vehicle seat according to the embodiment.
Figure 6:
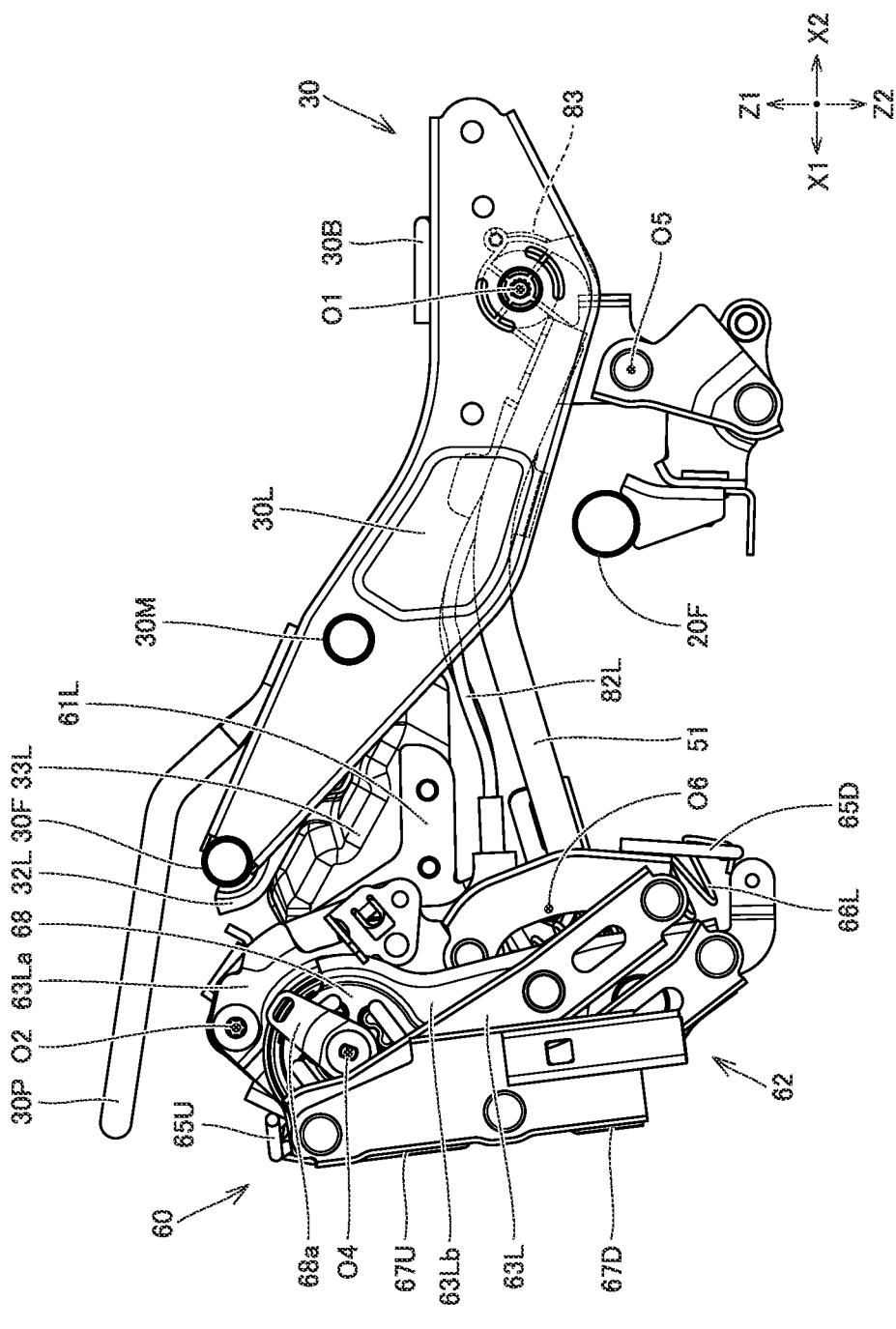
FIG. 6 is a schematic side view showing positions of a tip-up frame and an ottoman frame in the first used state of the vehicle seat according to the embodiment.
Figure 7:
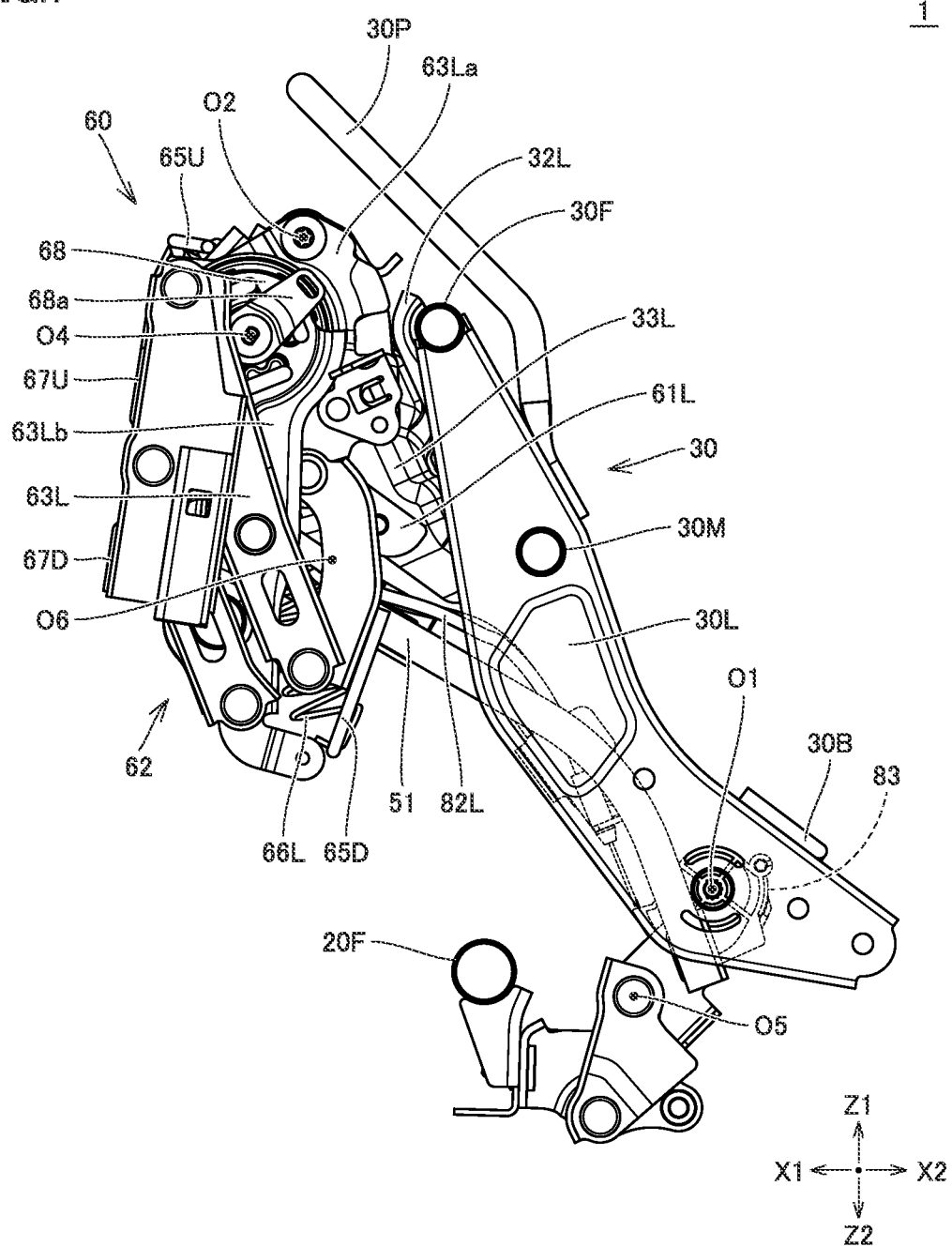
FIG. 7 is a schematic side view showing positions of the tip-up frame and the ottoman frame in the unused/stored state of the vehicle seat according to the embodiment.

FIGS. 4 and 5 are a schematic perspective view and a schematic plan view each showing states of the skeleton structures of the base portion, the seat cushion, and the ottoman in the first used state of the vehicle seat according to the present embodiment. FIG. 6 is a schematic side view showing the positions of the tip-up frame and the ottoman frame in the first used state of the vehicle seat according to the present embodiment, and FIG. 7 is a schematic side view showing the positions of the tip-up frame and the ottoman frame in the unused/stored state. Next, referring to FIGS. 4 to 7, the skeleton structures of base portion 2, seat cushion 3, and ottoman 6 of vehicle seat 1 according to the present embodiment will be described, and these positions in the first used state, the second used state, and the unused/stored state will be described in detail. It should be noted that in FIGS. 4 to 7, for ease of understanding, portions of each of base frame 20, tip-up frame 30, and ottoman frame 60 are not shown.

As shown in FIGS. 4 to 7, base frame 20 has a shape of frame when viewed in a plan view, and has: side frames 20L, 20R, which are a pair of left and right frames; and a front pipe 20F and a rear pipe 20B, which are a pair of front and rear frames.

Each of side frames 20L, 20R is constituted of a press-molded product obtained by pressing a metal plate such as a steel plate, and is disposed to extend along the seat forward/rearward direction (i.e., the X axis direction). Each of front pipe 20F and rear pipe 20B is constituted of a metal cylindrical member such as a steel pipe, and is disposed to extend along the seat width direction (i.e., the Y axis direction). Front pipe 20F couples the front ends of side frames 20L, 20R to each other, and rear pipe 20B couples rear ends of side frames 20L, 20R to each other.

Tip-up frame 30 has a shape of frame when viewed in a plan view, and has: side frames 30L, 30R, which are a pair of left and right frames, and a front pipe 30F, a rear wire 30B, an intermediate pipe 30M, an additional pipe 30P, and an additional wire 30Q, which are frames disposed side by side in the forward/rearward direction.

Each of side frames 30L, 30R is constituted of a press-molded product obtained by pressing a metal plate such as a steel plate, and is disposed to extend substantially along the seat forward/rearward direction (i.e., the X axis direction). Each of front pipe 30F and intermediate pipe 30M is constituted of a metal cylindrical member such as a steel pipe, and is disposed to extend along the seat width direction (i.e., the Y axis direction). Additional pipe 30P is constituted of, for example, a metal cylindrical member such as a steel pipe, and includes: a pair of left and right portions bent in a substantially U-shape and therefore disposed to extend along the seat forward/rearward direction (i.e., the X axis direction), and a portion disposed to extend along the seat width direction (i.e., the Y axis direction). Each of rear wire 30B and additional wire 30Q is constituted of a metal wire member composed of, for example, a steel material, is formed to be bent in a predetermined shape, and is disposed along the seat width direction (i.e., the Y axis direction). Front pipe 30F couples the front end portions of side frames 30L, 30R to each other, and intermediate pipe 30M couples the center portions of side frames 30L, 30R to each other. Rear wire 30B is connected to a rear end portion of each of side frames 30L, 30R. Additional pipe 30P is connected to a central portion of each of side frames 30L, 30R, and additional wire 30Q is connected to the pair of left and right portions of additional pipe 30P extending along the seat forward/rearward direction.

The rear end portions of side frames 30L, 30R of tip-up frame 30 are respectively pivotably supported by side frames 20L, 20R of base frame 20. At coupling portions between tip-up frame 30 and base frame 20, there are provided biasing members 43L, 43R that constitute portions of below-described switching mechanisms 40L, 40R (particularly, see FIG. 5). Thus, first pivotal axis O1 extends along the seat width direction at the portion at which tip-up frame 30 is pivotably supported. It should be noted that each of biasing members 43L, 43R is constituted of, for example, a spiral spring.

Here, tip-up frame 30 is biased by biasing members 43L, 43R in a direction of flipping up (i.e., a direction in which the front end portion of tip-up frame 30 comes closer to seat back 4). Further, tip-up frame 30 is configured to be restricted from being pivoted against the biasing force of biasing members 43L, 43R by a pair of engagement portions 46a, 46b (see FIG. 5, in particular) constituting portions of switching mechanism 40L described later. Thus, when the engagement by engagement portions 46a, 46b is canceled due to the manipulation of the manipulation portion or the like as described above, tip-up frame 30 is pivoted, thereby flipping up seat cushion 3.

At front pipe 30F and intermediate pipe 30M of tip-up frame 30, a pair of left and right base brackets 32L, 32R are provided to bridge therebetween. Connection brackets 33L, 33R are assembled to base brackets 32L, 32R, respectively. Connection brackets 33L, 33R are regions to which ottoman 6 is assembled, and are located to protrude obliquely downward and forward from the front end portion of tip-up frame 30. Each of base brackets 32L, 32R and connection brackets 33L, 33R is constituted of a press-molded product obtained by pressing a metal plate such as a steel plate.

Ottoman frame 60 mainly has a pair of left and right fixing brackets 61L, 61R and expanding mechanism 62 assembled to fixing brackets 61L, 61R. Here, expanding mechanism 62 is pivotably supported by fixing brackets 61L, 61R, and second pivotal axis O2 extends along the seat width direction at a portion at which expanding mechanism 62 is pivotably supported.

Fixing brackets 61L, 61R are disposed to face each other in the seat width direction (i.e., the Y axis direction), and each have a shape of plate. Fixing brackets 61L, 61R are fixed to the above-described pair of connection brackets 33L, 33R, respectively. Each of fixing brackets 61L, 61R is constituted of a press-molded product obtained by pressing a metal plate such as a steel plate.

Expanding mechanism 62 is extended and contracted with respect to first reference axis O4 to change the shape of ottoman 6 between the expanded state and the retracted state. That is, ottoman 6 is brought into the retracted state as shown in FIGS. 1 and 3 to 7 due to the contraction of expanding mechanism 62, and is brought into the expanded state as shown in FIG. 2 due to the extension of expanding mechanism 62.

Expanding mechanism 62 is constituted of a crosslink mechanism having a so-called pantograph structure, and mainly has: a pair of left and right links 63L, 63R constituted of a plurality of plates and a plurality of hinges; a pair of upper and lower pipes 64U, 64D and a pair of upper and lower wires 65U, 65D that couple links 63L, 63R to each other; a pair of right and left biasing members 66L, 66R suspended on wires 65U, 65D; and a pair of upper and lower mount portions 67U, 67D that couple links 63L, 63R to each other and that constitutes a base of leg rest surface 6a of ottoman 6.

Each of the plurality of plates of links 63L, 63R and mount portions 67U, 67D is constituted of a press-molded product obtained by pressing a metal plate such as a steel plate. Each of pipes 64U, 64D is constituted of a metal cylindrical member such as a steel pipe. Each of wires 65U, 65D is constituted of a metal wire member composed of, for example, a steel material or the like. Each of biasing members 66L, 66R is constituted of, for example, a coil spring.

The plurality of plates of the pair of left and right links 63L, 63R include: base links 63La, 63Ra pivotably assembled to fixing brackets 61L, 61R, respectively; and main links 63Lb. 63Rb pivotably assembled to base links 63La, 63Ra, respectively. Here, angle adjusting mechanism 68 is provided between base link 63La and main link 63Lb.

Base links 63La, 63Ra located on one end side of expanding mechanism 62 in the extension/contraction direction of expanding mechanism 62 are supported by fixing brackets 61L, 61R, respectively. Links 63L, 63R located on the other end side of expanding mechanism 62 in the extension/contraction direction of expanding mechanism 62 are fixed to mount portions 67U, 67D, respectively. Thus, links 63L, 63R couple fixing brackets 61L. 61R and mount portions 67U, 67D in an expandable and contractible manner. Hence, ottoman 6 is changed in shape by the extension/contraction of links 63L, 63R.

More specifically, in expanding mechanism 62, bias is provided by biasing members 66L, 66R in a direction in which base links 63La, 63Ra and mount portions 67D, 67U come closer to each other. Further, as described above, angle adjusting mechanism 68 is provided between base link 63La and main link 63Lb. Angle adjusting mechanism 68 is provided with an input lever 68a, and a traction cable (not shown) connected to the manipulation portion (not shown) is connected to input lever 68a. Input lever 68a and the traction cable are used to input, to angle adjusting mechanism 68, manipulation force generated by the manipulation on the manipulation portion.

Thus, when the manipulation force generated by the manipulation on the manipulation portion (not shown) is input to angle adjusting mechanism 68 via input lever 68a, expanding mechanism 62 is extended against the biasing force of biasing members 66L, 66R. As a result, ottoman 6 can be changed in shape from the retracted state to the expanded state. It should be noted that the change of the shape of ottoman 6 from the expanded state to the retracted state is realized by expanding mechanism 62 being contracted by the biasing force of biasing members 66L, 66R.

Here, when expanding mechanism 62 is changed in shape from the retracted state to the expanded state, ottoman 6 is changed in shape to flip up the tip portion of ottoman 6 (i.e., the distal end portion when viewed from first reference axis O4) (see arrow AR4 shown in FIG. 1). Thus, when seat cushion 3 is placed at the seating position and ottoman 6 is in the expanded state, ottoman 6 protrudes from the front end portion of seat cushion 3, with the result that leg rest surface 6a faces upward. Therefore, the second used state in which ottoman 6 is used can be realized.

It should be noted that angle adjusting mechanism 68 is provided with a maintaining mechanism that maintains the expanded state of expanding mechanism 62. Thus, an angle of main link 63Lb with respect to base link 63La can be adjusted based on a manipulation amount of the manipulation portion (not shown). Therefore, a degree of extension/contraction of expanding mechanism 62 can be adjusted by angle adjusting mechanism 68, with the result that the angle of leg rest surface 6a of ottoman 6 can be adjusted.

As shown in FIGS. 5 to 7, ottoman frame 60 is coupled to base frame 20 via conjunction mechanism 50 (see FIG. 5 in particular). More specifically, conjunction mechanism 50 has a coupling member 51 extending in the form of a bar. One end of coupling member 51 is coupled to front pipe 20F of base frame 20 pivotably with respect to a first coupling axis O5 (see FIGS. 6 and 7) shown in the figure. The other end of coupling member 51 is fixed to base link 63Ra (see FIGS. 4 and 5) of ottoman frame 60 pivotably with respect to a second coupling axis O6 (see FIGS. 6 and 7) shown in the figure.

Coupling member 51 serves to pivot ottoman frame 60 with respect to second pivotal axis O2 in conjunction with pivoting of tip-up frame 30 with respect to first pivotal axis O1. Details of coupling member 51 will be described later.

It should be noted that coupling member 51 is constituted of a metal cylindrical member such as a steel pipe.

As shown in FIGS. 4 to 7, vehicle seat 1 is provided with a locking mechanism 80 (see FIGS. 4 and 5 in particular). Locking mechanism 80 includes: anchoring portions 81L, 81R provided at connection portions between tip-up frame 30 and ottoman frame 60; a wound member 83 provided at base frame 20; and traction cables 82L, 82R that connect anchoring portions 81L, 81R to wound member 83.

With locking mechanism 80 provided, the relative movement of ottoman 6 with respect to the seat cushion is permitted in the state in which seat cushion 3 is not placed at the seating position, and the relative movement of ottoman 6 with respect to seat cushion 3 is restricted in the state in which seat cushion 3 is placed at the seating position as described above. The configuration and operation of locking mechanism 80 will be described in detail later.

Since vehicle seat 1 according to the present embodiment includes the above-described skeleton structures, switching can be made to the above-described first used state, second used state, and unused/stored state in vehicle seat 1 according to the present embodiment.

Here, referring to FIGS. 1, 2, and 4 to 6, in each of the first used state and the second used state, seat cushion 3 is placed at the seating position as described above. The seating position is a position at which the occupant can be seated when seating surface 3a provided on seat cushion 3 faces upward.

On the other hand, referring to FIGS. 3 and 7, in the unused/stored state, seat cushion 3 is placed at the raised position as described above. The raised position is a position at which seat cushion 3 is raised by the front end portion of seat cushion 3 being flipped up from the above-described seating position.

That is, in vehicle seat 1 according to the present embodiment, seat cushion 3 is movable relative to base portion 2 between the seating position and the raised position, the seating position being a position at which seat cushion 3 allows for seating by seating surface 3a facing upward, the raised position being a position at which seat cushion 3 is raised by the front end portion of seat cushion 3 being flipped up from the seating position. This movement of seat cushion 3 is realized by pivoting tip-up frame 30 with respect to first pivotal axis O1 by manipulating the manipulation portion (not shown) or the like.

Referring to FIGS. 1, 2, and 4 to 6, in each of the first used state and the second used state, seat back 4 is placed at the back rest position as described above. The back rest position is a position at which the occupant can lean back thereagainst when back rest surface 4a provided on seat back 4 faces forward.

On the other hand, referring to FIGS. 3 and 7, in the unused/stored state, seat back 4 is placed at the inclined position as described above. The inclined position is a position at which seat back 4 is inclined by the upper end portion of seat back 4 being moved forward and downward from the back rest position.

That is, in vehicle seat 1 according to the present embodiment, seat back 4 is movable relative to base portion 2 between the back rest position and the inclined position, the back rest position being a position at which seat back 4 allows for leaning back against the seat back by back rest surface 4a facing forward, the inclined position being a position at which seat back 4 is inclined by the upper end portion of seat back 4 being moved forward and downward from the back rest position. This movement of seat back 4 is realized by pivoting the back frame (not shown) with respect to third pivotal axis O3 by manipulating the manipulation portion (not shown) or the like.

It should be noted that in vehicle seat 1 according to the present embodiment, by employing a known method, seat cushion 3 is preferably configured to be moved from the seating position to the raised position in conjunction with the movement of seat back 4 from the back rest position to the inclined position. With such a configuration, vehicle seat 1 can be changed immediately from the first used state to the unused/stored state, thereby attaining excellent usability.

Further, referring to FIGS. 1 and 3 to 7, in each of the first used state and the unused/stored state, ottoman 6 is in the retracted state as described above. The retracted state is a state in which ottoman 6 is retracted by ottoman 6 being located on a side opposite to a side on which seating surface 3a of seat cushion 3 is located when viewed from seat cushion 3.

On the other hand, referring to FIG. 2, in the second used state, ottoman 6 is in the expanded state as described above. The expanded state is a state in which ottoman 6 is expanded to protrude from the front end portion of seat cushion 3 by the tip portion of ottoman 6 being flipped up from the retracted state.

That is, in vehicle seat 1 according to the present embodiment, ottoman 6 is changeable in shape between the retracted state and the expanded state, the retracted state being a state in which ottoman 6 is retracted by ottoman 6 being located on the side opposite to the side on which seating surface 3a is located when viewed from seat cushion 3, the expanded state being a state in which ottoman 6 is expanded to protrude from the front end portion of seat cushion 3 by the tip portion of ottoman 6 being flipped up from the retracted state. The change of the shape of ottoman 6 is realized by the extension/contraction of expanding mechanism 62 of ottoman 6 with respect to first reference axis O4 by manipulating the manipulation portion (not shown) or the like.

In addition, referring to FIGS. 1 and 4 to 6, in the first used state in which seat cushion 3 is placed at the seating position and ottoman 6 is in the retracted state, ottoman 6 is placed at the standby position at which ottoman 6 can be expanded by expanding mechanism 62. The standby position is a position farther away from seating surface 3a of seat cushion 3 relative to the stored position described later.

On the other hand, referring to FIGS. 3 and 7, in the unused/stored state in which seat cushion 3 is placed at the raised position and ottoman 6 is in the retracted state, ottoman 6 is placed at the stored position at which ottoman 6 cannot be expanded by expanding mechanism 62. The stored position is a position closer to seating surface 3a of seat cushion 3 relative to the standby position.

A change in the relative position of ottoman 6 with respect to seat cushion 3 is caused due to the following reason: ottoman frame 60 is pivotably supported by tip-up frame 30, and at the same time, ottoman frame 60 is coupled to base frame 20 via conjunction mechanism 50.

More specifically, referring to FIGS. 6 and 7, in vehicle seat 1 according to the present embodiment, a distance between first pivotal axis O1 serving as the pivoting center of tip-up frame 30 and second pivotal axis O2 serving as the pivoting center of ottoman frame 60 (i.e., the pivoting radius of second pivotal axis O2 with respect to first pivotal axis O1), a distance between first coupling axis O5 provided at the end portion of coupling member 51 on the base frame 20 side and second coupling axis O6 provided at the end portion of coupling member 51 on the ottoman frame 60 side (i.e., the pivoting radius of second coupling axis O6 with respect to first coupling axis O5), and respective positions at which first pivotal axis O1, second pivotal axis O2, first coupling axis O5, and second coupling axis O6 are provided are appropriately set to mutually satisfy a predetermined condition.

Thus, when tip-up frame 30 is pivoted with respect to first pivotal axis O1, seat cushion 3 is pivoted between the seating position and the raised position. When ottoman frame 60 is pivoted with respect to second pivotal axis O2 in conjunction with the pivoting of tip-up frame 30, ottoman 6 is pivoted between the standby position and the stored position.

That is, in vehicle seat 1 according to the present embodiment, when seat cushion 3 is placed at the seating position and ottoman 6 is in the retracted state, ottoman 6 is placed at the standby position. When seat cushion 3 is placed at the raised position, ottoman 6 is placed at the stored position. Thus, when seat cushion 3 is placed at the raised position and ottoman 6 is in the retracted state, ottoman 6 can be more drawn to the seat cushion 3 side, thereby facilitating vehicle seat 1 to be compact as a whole.

Figure 8:
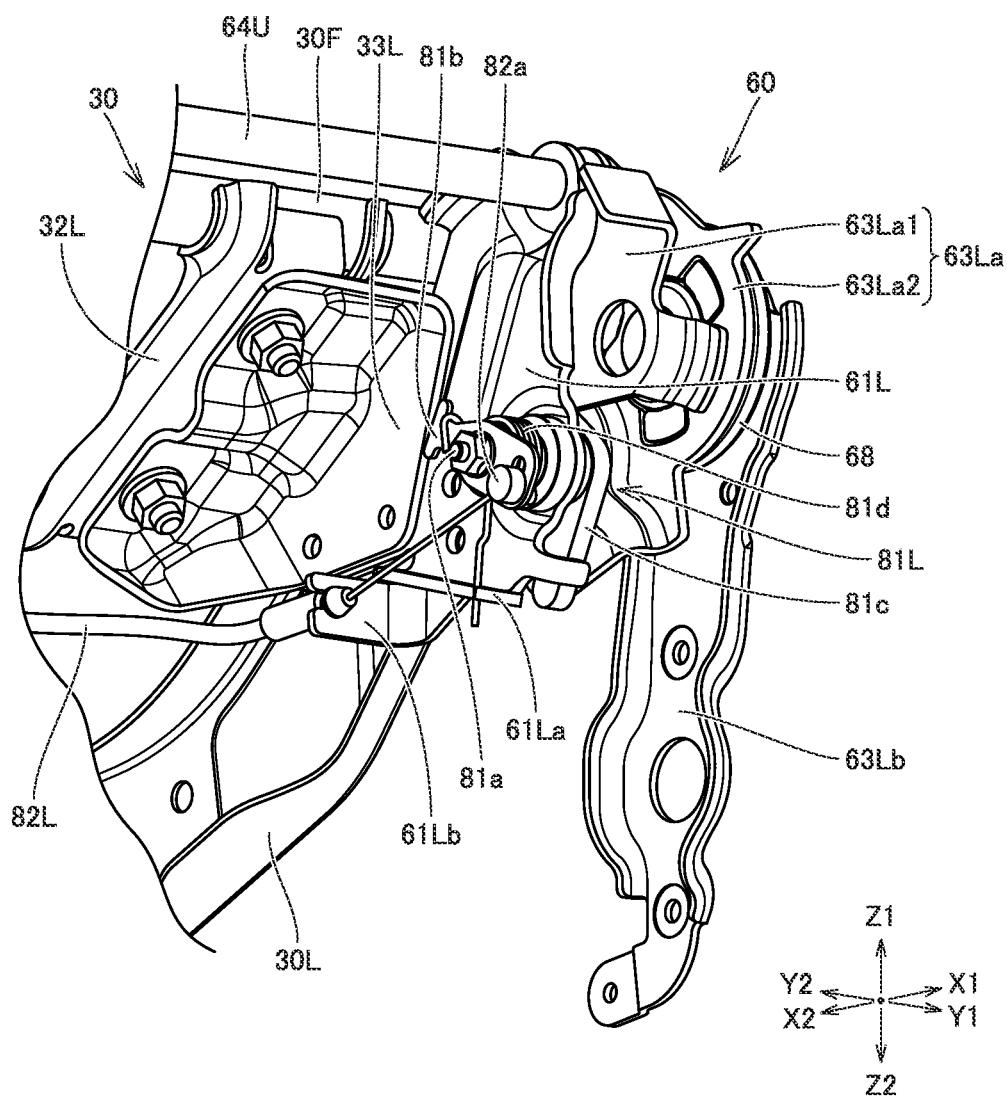
FIG. 8 is a schematic perspective view showing a configuration of an anchoring portion of a locking mechanism of the vehicle seat according to the embodiment.
Figure 9:
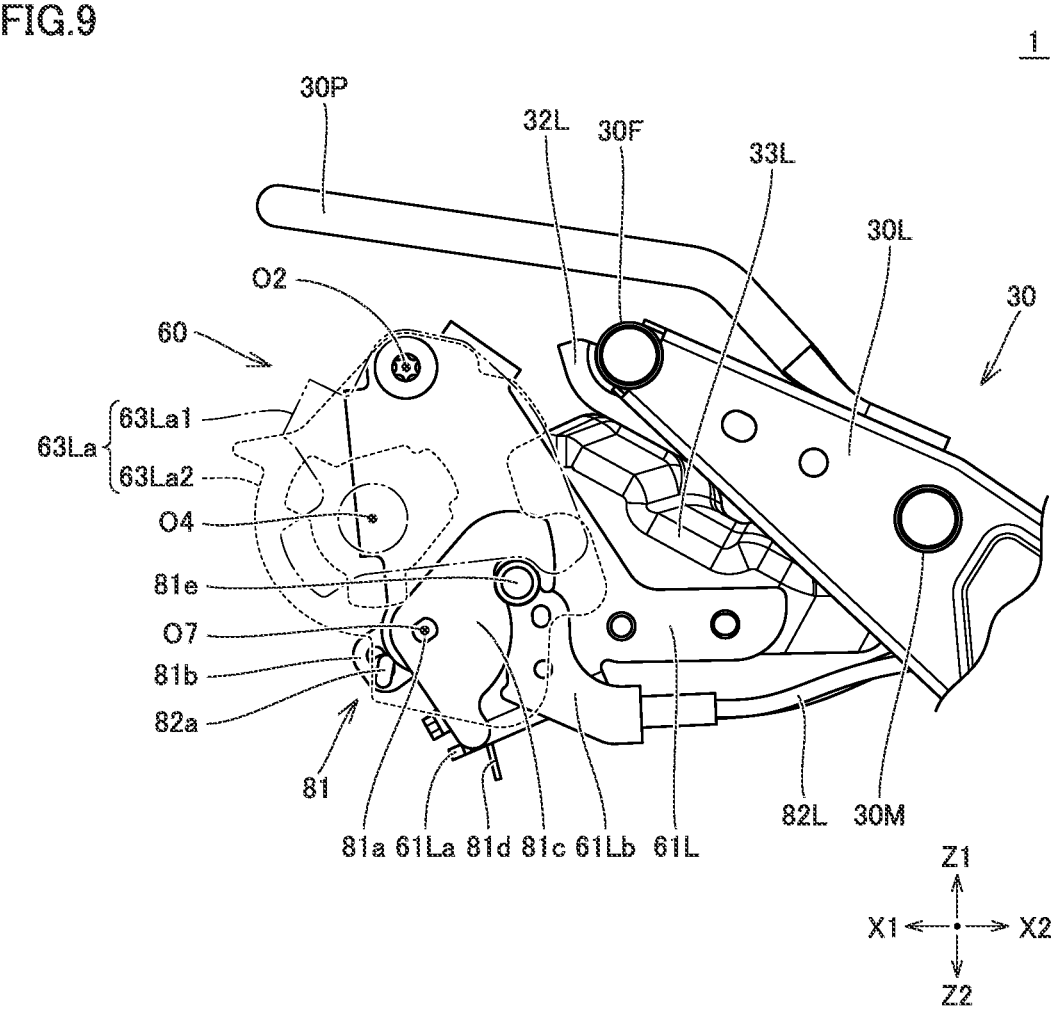
FIG. 9 is a partial transparent side view showing the configuration of the anchoring portion of the locking mechanism of the vehicle seat according to the embodiment.
Figure 10:
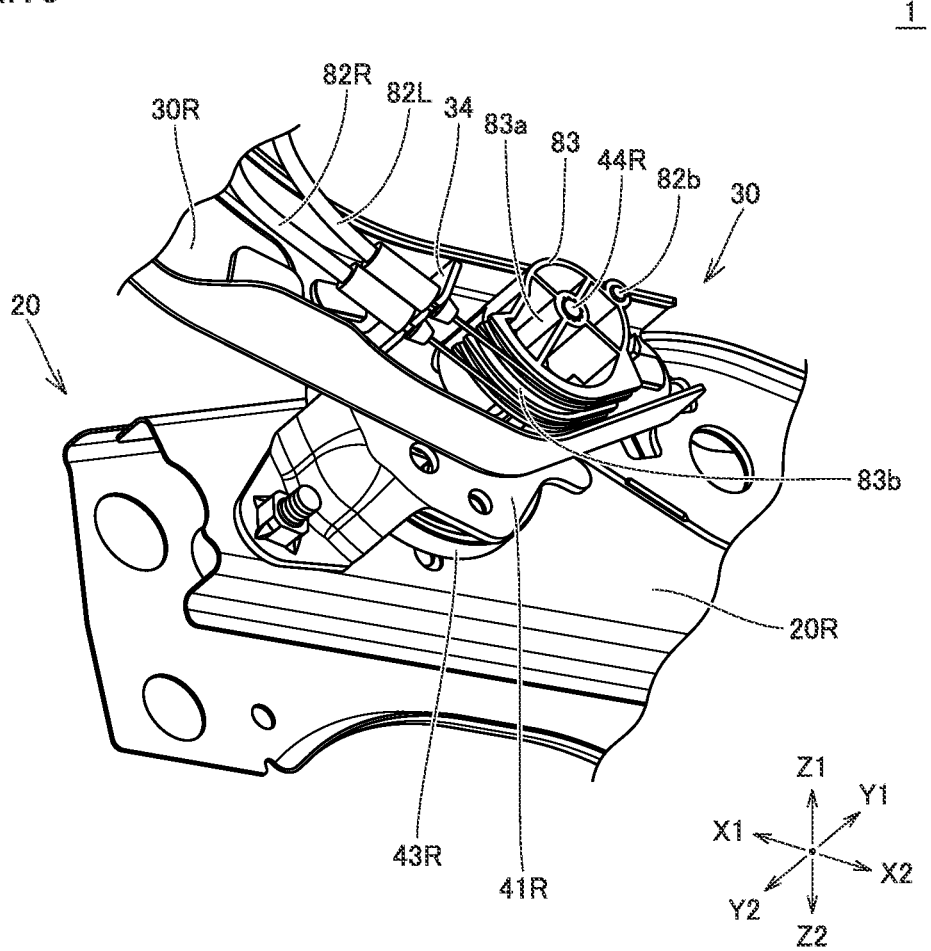
FIG. 10 is a schematic perspective view showing a configuration in the vicinity of a wound member of the locking mechanism of the vehicle seat according to the embodiment.
Figure 11:
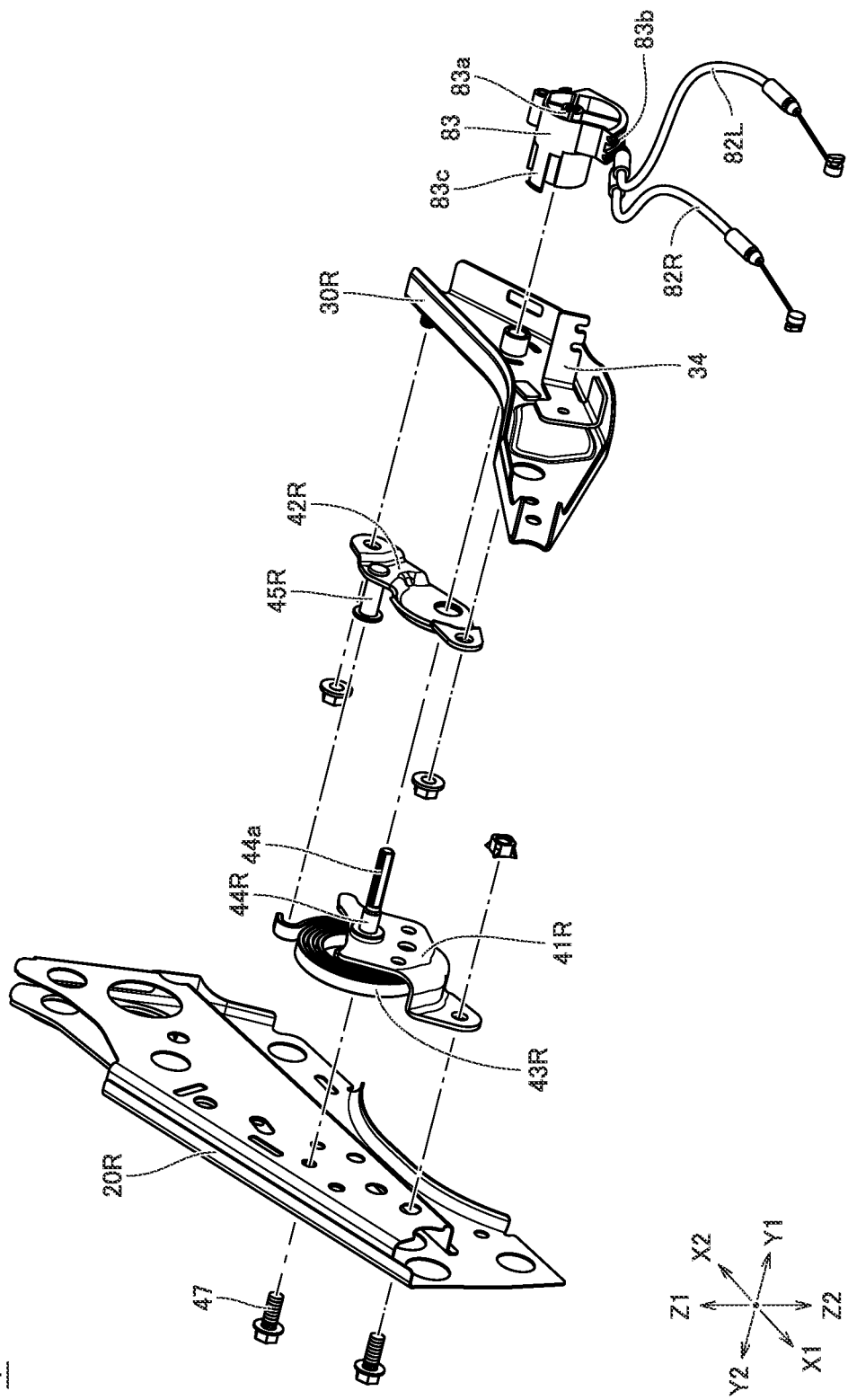
FIG. 11 is an exploded perspective view showing an assembly structure in the vicinity of the wound member of the locking mechanism of the vehicle seat according to the embodiment.
Figure 12:
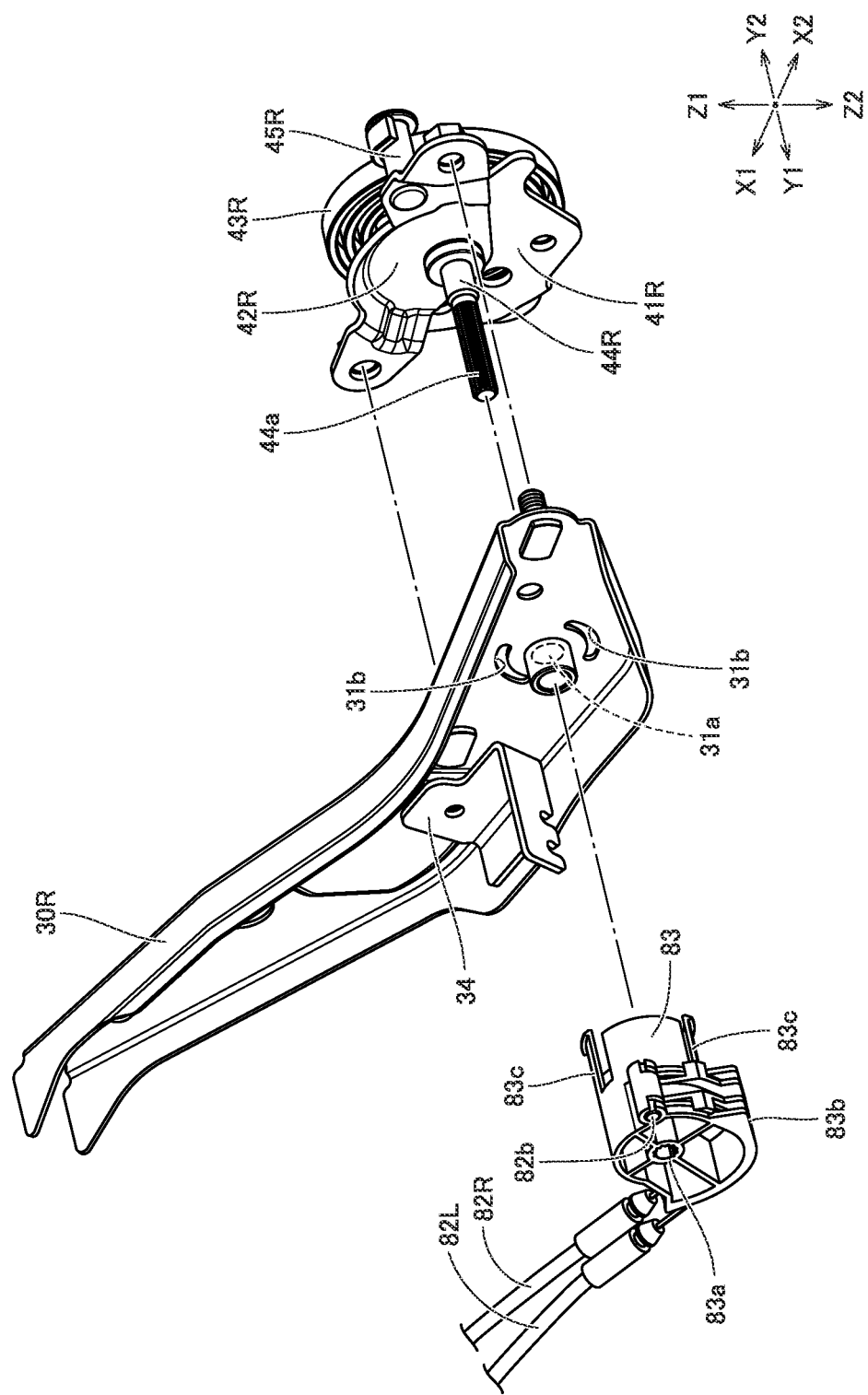
FIG. 12 is an exploded perspective view showing the assembly structure in the vicinity of the wound member of the locking mechanism of the vehicle seat according to the embodiment.

FIGS. 8 and 9 are a schematic perspective view and a partial transparent side view each showing the structure of each anchoring portion of the locking mechanism of the vehicle seat according to the present embodiment. FIG. 10 is a schematic perspective view showing a structure in the vicinity of the wound member of the locking mechanism of the vehicle seat according to the present embodiment. FIGS. 11 and 12 are exploded perspective views each showing an assembly structure in the vicinity of the wound member. Next, the configuration of locking mechanism 80 provided in vehicle seat 1 according to the present embodiment will be described in detail with reference to FIGS. 8 to 12.

Referring to FIGS. 8 to 12, as described above, locking mechanism 80 includes: anchoring portions 81L, 81R (only anchoring portion 81L of anchoring portions 81L, 81R is illustrated in FIGS. 8 and 9) provided at the connection portions between tip-up frame 30 and ottoman frame 60; wound member 83 provided at base frame 20; and traction cables 82L, 82R that connect anchoring portions 81L, 81R to wound member 83.

As shown in FIGS. 8 and 9, anchoring portion 81L includes: a connection shaft 81a, a base plate 81b, a hook member 81c, and a torsion spring 81d, which are assembled to fixing bracket 61L; and a hooked portion 81e assembled to base link 63La.

A through hole is provided at a predetermined position of fixing bracket 61L, and connection shaft 81a is inserted in the through hole to pass therethrough. Base plate 81b is fixed on one end side of connection shaft 81a (i.e., inner side in the seat width direction when viewed from fixing bracket 61L), and hook member 81c is fixed on the other end side of connection shaft 81a (i.e., outer side in the seat width direction when viewed from fixing bracket 61L). Thus, connection shaft Sla, base plate 81b, and hook member 81c are pivotably supported collectively by fixing bracket 61L with respect to a second reference axis O7 (see FIG. 9) extending along the axis of connection shaft 81a.

Fixing bracket 61L is provided with a retaining portion 61La. One end of torsion spring 81d externally surrounding connection shaft 81a is retained at retaining portion 61La. On the other hand, the other end of torsion spring 81d is retained at a predetermined position of base plate 81b. Thus, connection shaft 81a, base plate 81b, and hook member 81c, which are supported by fixing bracket 61L so as to be pivoted collectively, are biased by torsion spring 81d to one side in the pivoting direction.

Further, fixing bracket 61L is provided with a supporting bracket 61Lb that supports traction cable 82L. One end 82a of traction cable 82L supported by supporting bracket 61Lb is connected to base plate 81b.

Thus, when traction cable 82L is drawn, base plate 81b is pivoted with respect to second reference axis O7 against the biasing force of torsion spring 81d, with the result that hook member 81c is also pivoted. It should be noted that when the drawing of traction cable 82L is canceled, hook member 81c is also returned to its original position due to the biasing force of torsion spring 81d.

Hooked portion 81e is constituted of, for example, a pin-shaped striker fixed to base link 63La, and protrudes inward from base link 63La in the seat width direction. Hook member 81c is provided with a cutout portion. Hooked portion 81e can be inserted in the cutout portion. It should be noted that base link 63La has a plate-shaped first member 63La1 and a plate-shaped second member 63La2, which are provided on each other in one piece with first member 63La1 and second member 63La2 being welded or the like to each other. Hooked portion 81e is provided at second member 63La2.

Here, the installation position of hooked portion 81e is adjusted such that hooked portion 81e is disposed in the cutout portion of hook member 81c when the drawing of traction cable 82L is canceled. Due to the engagement of hooked portion 81e and hook member 81c in the state in which hooked portion 81e is disposed in the cutout portion, the position of base link 63La with respect to fixing bracket 61L is fixed. On the other hand, when traction cable 82L is drawn, hooked portion 81e and hook member 81c are disengaged from each other, with the result that the fixation of the position of base link 63La to fixing bracket 61L is canceled.

As described above, fixing bracket 61L is fixed to tip-up frame 30 via connection bracket 33L and base bracket 32L, and base link 63La constitutes a portion of expanding mechanism 62 and is pivotably supported by fixing bracket 61L with respect to second pivotal axis O2. Therefore, by switching the engagement and disengagement of hook member 81c with and from hooked portion 81e, the anchoring of ottoman 6 to tip-up frame 30 and the canceling of the anchoring can be realized.

Although not described and illustrated in detail here, anchoring portion 81R has substantially the same configuration as that of anchoring portion 81L. When the drawing of traction cable 82R is canceled, the position of base link 63Ra with respect to fixing bracket 61R is fixed. When traction cable 82R is drawn, the fixation of the position of base link 63Ra with respect to fixing bracket 61R is canceled.

As shown in FIGS. 10 to 12, wound member 83 is constituted of a resin member having a substantially cylindrical outer shape, and has a stem supporting portion 83a, a wound portion 83b, and claw-shaped portions 83c. Wound member 83 is unmovably fixed to side frame 20R of base frame 20 as described later. Therefore, even when tip-up frame 30 is pivoted, wound member 83 is not pivoted or moved.

Wound member 83 is disposed on an inner side in the seat width direction when viewed from side frame 30R of tip-up frame 30, and is located to protrude from side frame 30R. More specifically, wound member 83 is disposed on the inner side with respect to side frame 30R in the seat width direction and is disposed to be coaxial with first pivotal axis O1 serving as the pivoting center of tip-up frame 30.

Stem supporting portion 83a and claw-shaped portions 83c provided in wound member 83 are regions for unmovably fixing wound member 83 to side frame 20R of base frame 20 with wound member 83 being slidably in abutment with side frame 30R of tip-up frame 30.

Specifically, stem supporting portion 83a is provided with a non-circular hole. A stem portion 44a of a pin 44R, which is a portion of an assembly jig for assembling below-described switching mechanism 40R to tip-up frame 30, is inserted in the non-circular hole. Pin 44R is constituted of a partially-teeth-lacked serration pin having no teeth formed on a portion of the peripheral surface of stem portion 44a. The non-circular hole has a shape corresponding to stem portion 44a of pin 44R.

As described later, pin 44R is fixed to a fixation-side bracket 41R of switching mechanism 40R by, for example, caulking or the like. Fixation-side bracket 41R is fixed to side frame 20R of base frame 20, with the result that wound member 83 is assembled to side frame 20R through fixation-side bracket 41R by pin 44R. It should be noted that pin 44R is inserted into a non-circular hole of wound member 83 with pin 44R passing through a through hole 31a (see FIG. 12) provided in side frame 30R of tip-up frame 30.

On the other hand, the pair of claw-shaped portions 83c are provided at an outer end portion of wound member 83 in the seat width direction. Each of the pair of claw-shaped portions 83c has a shape of claw with a bent tip. The pair of claw-shaped portions 83c are respectively inserted into a pair of receiving holes 31b (see FIG. 12) provided in side frame 30R of tip-up frame 30 to engage with side frame 30R, with the result that wound member 83 is assembled to side frame 30R.

Here, each of the pair of receiving holes 31b extends in the form of arc so as to surround first pivotal axis O1. Thus, when tip-up frame 30 is pivoted, receiving hole 31b is moved with claw-shaped portion 83c being engaged with receiving hole 31b.

By employing the above-described assembly structure, wound member 83 is unmovably fixed to side frame 20R of base frame 20 with wound member 83 being slidably in abutment with side frame 30R of tip-up frame 30. Therefore, by employing the assembly structure, with a comparatively simple configuration, wound member 83 can be unmovably fixed to base frame 20 through tip-up frame 30.

Further, since the non-circular hole is provided in wound member 83 and pin 44R having a shape corresponding to the non-circular hole is inserted in the non-circular hole as described above, positioning of wound member 83 in the peripheral direction can be facilitated. Therefore, by employing such a configuration, operability during an assembly operation is significantly improved.

Further, since the pin for fixing the wound member to the base frame also serves as a portion of the assembly jig for assembling the switching mechanism to the tip-up frame as described above, the number of components can be reduced and the assembly operation can be further facilitated.

Wound portion 83b provided in wound member 83 is a region around which traction cables 82L, 82R are wound. Specifically, a pair of grooves are provided along the peripheral direction in the peripheral surface of wound portion 83b, and traction cables 82L, 82R are fitted in the pair of grooves, respectively. Other ends 82b of traction cables 82L, 82R are fixed to predetermined positions on the peripheral surface of wound member 83.

Here, the peripheral surface of wound portion 83b in which the grooves are formed is located at a portion of wound member 83 on the lower end side of wound member 83 along the seat upward/downward direction (i.e., the Z axis direction), and other ends 82b of traction cables 82L, 82R are fixed at positions of wound member 83 on the peripheral surface on the rear end side of wound member 83 along the seat forward/rearward direction (i.e., the X axis direction). Thus, the portions of traction cables 82L, 82R close to other ends 82b are wound around wound portion 83b from the peripheral surface of wound member 83 on the substantially rear end side to the peripheral surface of wound member 83 on the lower end side.

Since not only wound portion 83b for winding traction cables 82L, 82R is provided in wound member 83 but also the fixed portions of other ends 82b of traction cables 82L, 82R are provided therein in this way, traction cables 82L, 82R can be fixed to base frame 20 with other ends 82b of traction cables 82L, 82R being fixed to wound member 83 in advance in the assembly operation, thus significantly improving operability in the assembly operation.

Portions of traction cables 82L, 82R other than the portions close to other ends 82b extend to the seat front side so as to be separated away from wound member 83. A supporting bracket 34 is provided at a predetermined position of side frame 30R of tip-up frame 30, and supporting bracket 34 supports the portions of traction cables 82L, 82R that are separated away from wound member 83.

It should be noted that one end 82a of traction cable 82L located on the side opposite to other end 82b thereof is connected to anchoring portion 81L as described above, with the result that anchoring portion 81L and wound member 83 are connected to each other by traction cable 82L. On the other hand, one end 82a of traction cable 82R located on the side opposite to other end 82b thereof is connected to anchoring portion 81R as described above, with the result that anchoring portion 81R and wound member 83 are connected to each other by traction cable 82R.

As shown in FIGS. 10 to 12, switching mechanism 40R is provided in the vicinity of the position at which wound member 83 is provided. Switching mechanism 40R is provided to be interposed between side frame 20R of base frame 20 and side frame 30R of tip-up frame 30, and most portions of switching mechanism 40R are disposed between side frames 20R, 30R. Switching mechanism 40R switches seat cushion 3 between the state in which seat cushion 3 is placed at the seating position and the state in which seat cushion 3 is placed at the raised position.

Switching mechanism 40R mainly has: a fixation-side bracket 41R unmovably fixed to side frame 20R; a pivoting-side bracket 42R unmovably fixed to side frame 30R; biasing member 43R constituted of a spiral spring; bolts 47 for fixing fixation-side bracket 41R to side frame 20R; and pin 44R that pivotably supports pivoting-side bracket 42R and side frame 30R with pin 44R being fixed to fixation-side bracket 41R and being inserted to pass through a through hole provided in pivoting-side bracket 42R and a through hole 31a provided in side frame 30R. Pin 44R defines first pivotal axis O1 as the pivoting center of tip-up frame 30, and is also used to assemble wound member 83.

Here, one end of biasing member 43R is fixed to fixation-side bracket 41R, and the other end thereof is engaged with retaining portion 45R provided at pivoting-side bracket 42R, thereby biasing tip-up frame 30 toward base frame 20. More specifically, as described above, biasing member 43L elastically biases tip-up frame 30 with respect to first pivotal axis O1 in the direction in which the front end portion of tip-up frame 30 is flipped up (i.e., the direction in which the front end portion of tip-up frame 30 comes close to seat back 4).

Although not described and illustrated in detail here, a switching mechanism 40L is provided at a position facing switching mechanism 40R in the seat width direction. Referring to FIG. 5, switching mechanism 40L also has substantially the same configuration as that of switching mechanism 40R, and mainly has a fixation-side bracket 41L, a pivoting-side bracket 42L, a biasing member 43L, a pin 44L, and a hooked portion 45L. Pin 44L defines first pivotal axis O1 as the pivoting center of tip-up frame 30.

Here, switching mechanism 40L further has: a hook-shaped engagement portion 46a pivotably assembled to fixation-side bracket 41L; and a pin-shaped engagement portion 46b unmovably fixed to pivoting-side bracket 42L. These engagement portions 46a, 46b are connected to the manipulation portion (not shown) by, for example, the traction cables, and are moved between an engagement position and a non-engagement position in response to the manipulation on the manipulation portion.

That is, when engagement portions 46a, 46b are placed at the engagement position at which engagement portions 46a, 46b are engaged, the relative movement of tip-up frame 30 with respect to base frame 20 based on the biasing forces of biasing members 43L, 43R is restricted to maintain the state in which seat cushion 3 is placed at the seating position.

On the other hand, when engagement portions 46a, 46b are placed at the non-engagement position at which engagement portions 46a, 46b are not engaged, the relative movement of tip-up frame 30 with respect to base frame 20 based on the biasing force of biasing members 43L, 43R is permitted to move seat cushion 3 from the seating position to the raised position.

Thus, each of switching mechanisms 40L, 40R can switch seat cushion 3 between the state in which seat cushion 3 is placed at the seating position and the state in which seat cushion 3 is placed at the raised position. Particularly, when switching from the first used state to the unused/stored state, the front end portion of seat cushion 3 can be immediately flipped up by manipulating the above-described manipulation portion.

Figure 13A:
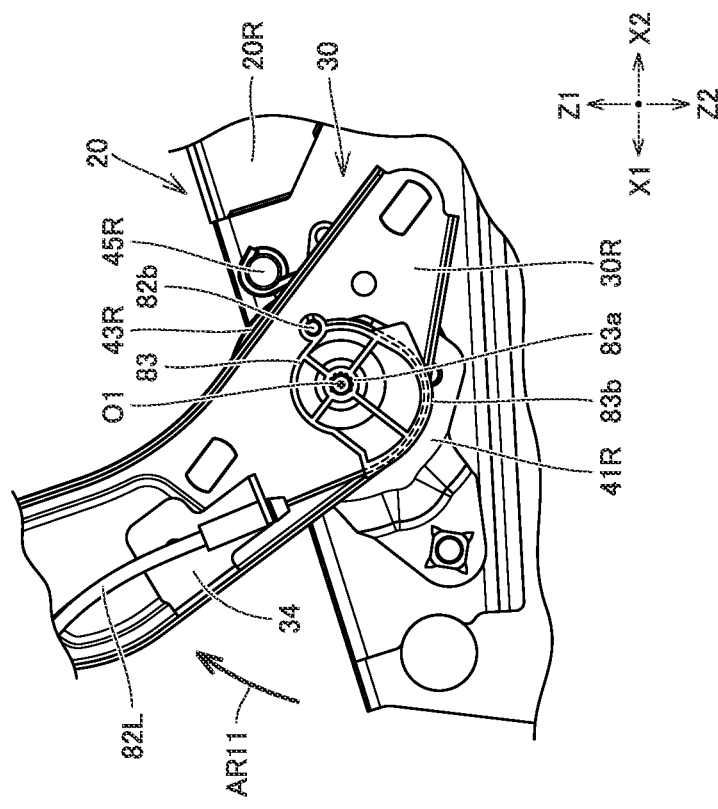
FIGS. 13A and 13B are schematic views for illustrating an operation of the locking mechanism of the vehicle seat according to the embodiment.
Figure 13B:
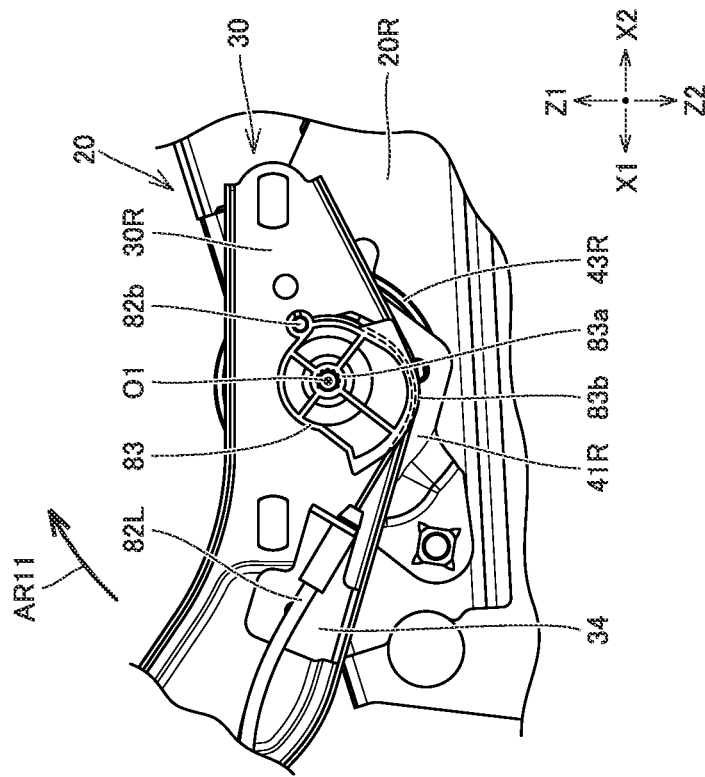
Figure 14A:
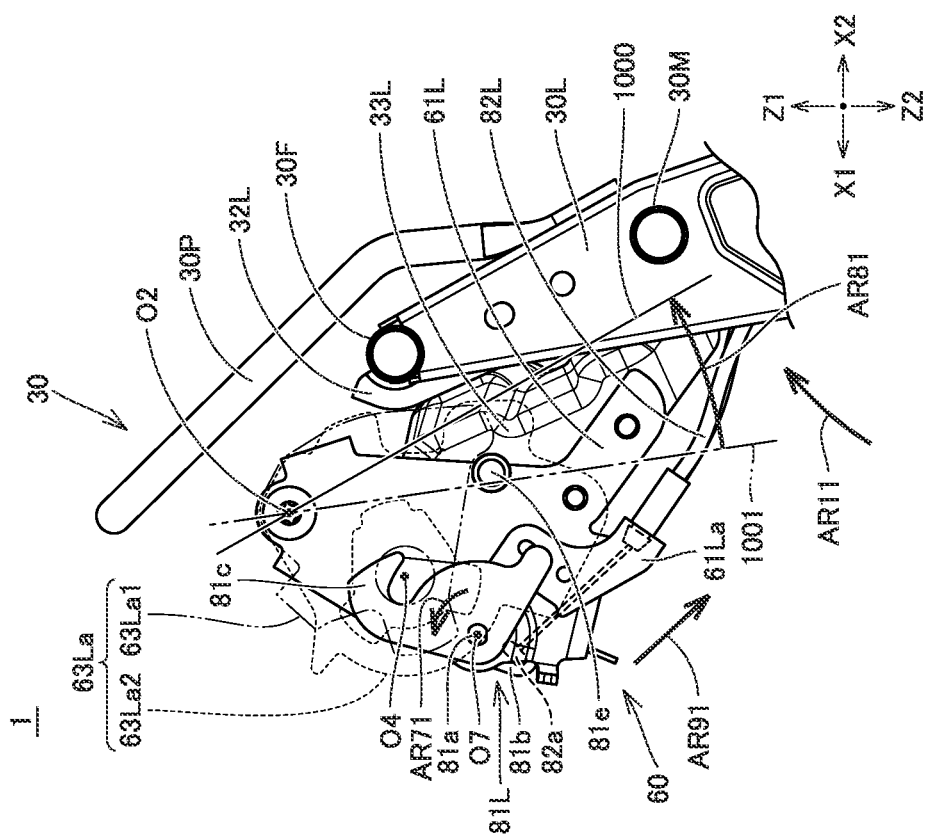
FIGS. 14A and 14B are schematic views for illustrating the operation of the locking mechanism of the vehicle seat according to the embodiment.
Figure 14B:
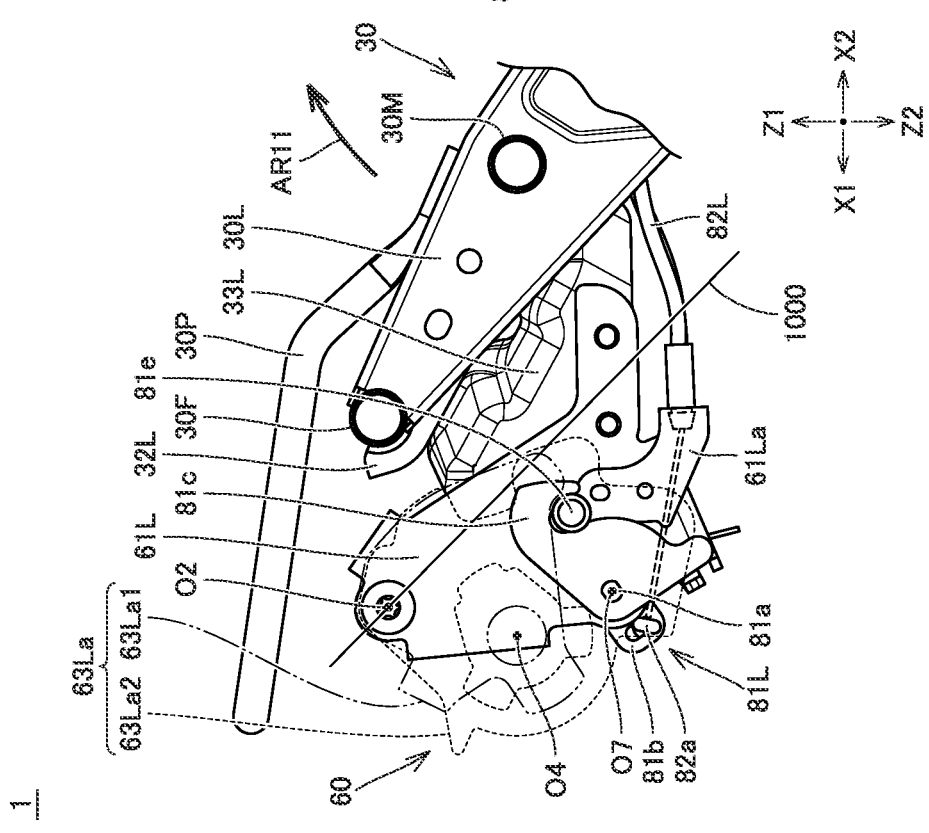

FIGS. 13A, 13B, 14A, and 14B are schematic views for illustrating the operation of the locking mechanism of the vehicle seat according to the embodiment. Each of FIGS. 13A and 13B is a diagram showing a state in the vicinity of the wound member of the locking mechanism. Each of FIGS. 14A and 14B is a diagram showing a state in the vicinity of the anchoring portion of the locking mechanism. Here, FIGS. 13A and 14A show the first used state, and FIGS. 13B and 14B show the unused/stored state. Hereinafter, the operation of locking mechanism 80 of vehicle seat 1 according to the present embodiment will be described with reference to FIGS. 13A, 13B, 14A, and 14B. It should be noted that in the description below, the operation will be described particularly with attention being paid to anchoring portion 81L and traction cable 82L of locking mechanism 80; however, anchoring portion 81R and traction cable 82R are operated in the same manner as anchoring portion 81L and traction cable 82L.

As shown in FIG. 13A, in the first used state in which tip-up frame 30 is at the seating position, traction cable 82L is wound from the peripheral surface of wound portion 83b on substantially the rear end side to a location slightly exceeding the peripheral surface on the lower end side. From the location slightly exceeding the peripheral surface on the lower end side, traction cable 82L extends to the seat front side so as to be separated away from wound portion 83b. In this state, as shown in FIG. 14A, traction cable 82L is not drawn, and hook member 81c is engaged with hooked portion 81e, thereby maintaining the state in which ottoman frame 60 is anchored to tip-up frame 30.

In the state shown in FIGS. 13A and 14A, when the manipulation portion (not shown) is manipulated to operate switching mechanisms 40L, 40R, tip-up frame 30 is pivoted with respect to first pivotal axis O1 in a direction of arrow AR11 shown in the figures. Here, since wound member 83 is unmovably fixed to base frame 20 as described above, wound member 83 stays in that place without following the pivoting of tip-up frame 30.

In response to this pivoting of tip-up frame 30, traction cable 82L supported by supporting bracket 34 is also moved in the direction of arrow AR11 as shown in FIG. 13B. On this occasion, since other end 82b of traction cable 821L is fixed to wound member 83, an amount of winding of traction cable 82L around wound portion 83b is changed.

Specifically, in a state in which tip-up frame 30 is pivoted with respect to first pivotal axis O1 in the direction of arrow AR11 to reach the raised position as shown in FIG. 13B, the portion of traction cable 82L close to other end 82b is wound around the peripheral surface of wound member 83 on the front end side of wound member 83 from the peripheral surface of wound member 83 on substantially the rear end side of wound member 83 via the peripheral surface of wound member 83 on the lower end side of wound member 83. Therefore, the amount of winding of traction cable 82L around wound portion 83b is increased as compared with that in the state shown in FIG. 13A.

Thus, as shown in FIG. 14B, traction cable 82L is drawn in a direction of arrow AR91 shown in the figure, and base plate 81b is pivoted due to one end 82a of traction cable 82L being moved, with the result that hook member 81c is also pivoted in a direction of arrow AR71 shown in the figure. Due to the pivoting of hook member 81c, the engagement of hook member 81c with hooked portion 81e is canceled, thereby canceling the anchoring of ottoman frame 60 to tip-up frame 30.

By canceling the anchoring of ottoman frame 60 to tip-up frame 30 in this way, the relative pivoting of ottoman frame 60 with respect to tip-up frame 30 is permitted to allow for movement of ottoman 6 between the standby position and the stored position by conjunction mechanism 50.

That is, as shown in FIG. 14A, in the first used state in which tip-up frame 30 is at the seating position, ottoman 6 is not drawn to the seat cushion 3 side by coupling member 51. Hence, ottoman 6 is placed at the standby position. On the other hand, as shown in FIG. 14B, in the unused/stored state in which tip-up frame 30 is at the raised position, ottoman 6 is drawn to the seat cushion 3 side by coupling member 51. Hence, ottoman 6 is placed at the stored position.

Here, in order to facilitate understanding with regard to this point, in each of FIGS. 14A and 14B, an imaginary line 1000 connecting second pivotal axis O2 to a predetermined position of base link 63La is indicated by a solid line, and in FIG. 14B, an imaginary line 1001 indicating the position is indicated by a chain double-dashed line at a position corresponding to the position of imaginary line 1000 in FIG. 14A. That is, since ottoman frame 60 is pivoted by an amount indicated by an arrow AR81 shown in FIG. 14B in conjunction with the movement of tip-up frame 30, ottoman 6 can be retracted compactly.

Although not described and illustrated in detail here, when tip-up frame 30 is moved from the raised position to the seating position, the state in which traction cable 82L is drawn is canceled due to the pivoting of tip-up frame 30, with the result that ottoman 6 is also returned from the stored position to the standby position. Further, hook member 81c is engaged with hooked portion 81e, with the result that ottoman frame 60 is returned to the state in which ottoman frame 60 is anchored to tip-up frame 30. Thus, ottoman 6 is anchored again by locking mechanism 80.

As described above, with vehicle seat 1 according to the present embodiment, most portions of locking mechanism 80 can be provided at a position away from ottoman 6 by using traction cables 82L, 82R. Moreover, the operation of locking mechanism 80 can be in conjunction with the movement of seat cushion 3 by utilizing such a fact that the amount of winding of traction cables 82L, 82R around wound portion 83b is changed due to the movement of seat cushion 3. Therefore, by employing the above configuration, compact retraction of ottoman 6 at the time of tip-up and stable operation of ottoman 6 at the time of seating can be realized while preventing increased size and complication of vehicle seat 1.

Further, in vehicle seat 1 according to the present embodiment, since wound member 83 provided with wound portion 83b is disposed to be coaxial with first pivotal axis O1 serving as the pivoting center of seat cushion 3, the lengths of traction cables 82L, 82R can be made considerably long. Therefore, by employing this configuration, a large change in the amount of winding of traction cables 82L, 82R can be ensured, with the result that the operation of locking mechanism 80 can be more securely in conjunction with the movement of seat cushion 3.

In the above-described embodiment, it has been illustratively described that the wound member is provided to be coaxial with the first pivotal axis, but the installation position of the wound member is not limited to this. Further, in the above-described embodiment, it has been illustratively described that the other end of each traction cable is fixed to the wound member, but the other end of the traction cable may be fixed to a portion other than the wound member.

Further, in the above-described embodiment, it has been illustratively described that the anchoring portion includes the hook member and the hooked portion; however, an anchoring portion having another structure can be employed. Further, in the above-described embodiment, it has been illustratively described that the pair of anchoring portions are provided at the left and right positions in the seat width direction; however, an anchoring portion may be provided only at one position in the seat width direction.

Thus, the number, shapes, positions, and the like of the wound members, traction cables, and anchoring portions in the locking mechanism can be changed variously as required, and these may be configured in any manner as long as the anchoring by the anchoring portion and the canceling of the anchoring can be realized by a change being made in the amount of winding of the traction cable around the wound portion in conjunction with the pivoting of the seat cushion.

In the above-described embodiment, it has been illustratively described that the characteristic configuration of the present disclosure is applied to the vehicle seat configured as a seat of an automobile; however, the characteristic configuration of the present disclosure can be applied to any vehicle seat such as a seat installed in a ship, an aircraft, a train, or the like.

The above-described contents of the present disclosure are summarized as follows.

A vehicle seat according to a certain aspect of the present disclosure includes a base portion, a seat cushion, and an ottoman. The base portion is installed on a floor of a vehicle. The seat cushion is provided on the base portion and has a seating surface. The ottoman is provided at a front end portion of the seat cushion and has a leg rest surface. The seat cushion is movable relative to the base portion between a seating position and a raised position, the seating position being a position at which the seat cushion allows for seating by the seating surface facing upward, the raised position being a position at which the seat cushion is raised by the front end portion of the seat cushion being flipped up from the seating position. The ottoman is changeable in shape between a retracted state and an expanded state, the retracted state being a state in which the ottoman is retracted by the ottoman being located on a side opposite to a side on which the seating surface is located when viewed from the seat cushion, the expanded state being a state in which the ottoman is expanded to protrude from the front end portion of the seat cushion by a tip portion of the ottoman being flipped up from the retracted state. The leg rest surface is provided to face upward when the seat cushion is placed at the seating position and the ottoman is in the expanded state. The vehicle seat according to the certain aspect of the present disclosure further includes a conjunction mechanism and a locking mechanism. The conjunction mechanism places the ottoman at a standby position when the seat cushion is placed at the seating position and the ottoman is in the retracted state, and changes a relative position of the ottoman with respect to the seat cushion in conjunction with movement of the seat cushion so as to place the ottoman at a stored position when the seat cushion is placed at the raised position, the stored position being a position closer to the seating surface relative to the standby position. In the vehicle seat according to the certain aspect of the present disclosure, the locking mechanism permits relative movement of the ottoman with respect to the seat cushion when the seat cushion is not placed at the seating position, and restricts the relative movement of the ottoman with respect to the seat cushion when the seat cushion is placed at the seating position. The locking mechanism has an anchoring portion for anchoring the ottoman, a traction cable that has one end connected to the anchoring portion and that has the other end fixed to the base portion, and a wound portion provided with a peripheral surface around which the traction cable is wound. The locking mechanism is configured to cause anchoring of the ottoman by the anchoring portion and canceling of the anchoring in response to a change being made in an amount of winding of the traction cable around the wound portion when the seat cushion is moved relative to the base portion.

With such a configuration, most portions of the locking mechanism can be provided at a position away from the ottoman by using the traction cable. Moreover, the operation of the locking mechanism can be in conjunction with the movement of the seat cushion by utilizing such a fact that the amount of winding of the traction cable around the wound portion is changed due to the movement of the seat cushion. Therefore, by employing the above configuration, in the vehicle seat configured to realize the expanded state of the ottoman by changing the shape of the ottoman itself, compact retraction of the ottoman at the time of tip-up and stable operation of the ottoman at the time of seating can be realized while preventing increased size and complication of the vehicle seat.

In the vehicle seat according to a certain embodiment of the present disclosure, the base portion may have a base frame that constitutes a skeleton of the base portion, and the seat cushion may have a tip-up frame that constitutes a skeleton of the seat cushion. In this case, the tip-up frame may be pivotably supported by the base frame with respect to a first pivotal axis extending along a seat width direction, and the seat cushion may be pivoted between the seating position and the raised position by the tip-up frame being pivoted with respect to the first pivotal axis. Further, in this case, a wound member provided with the wound portion is preferably fixed to the base frame so as to be located to be coaxial with the first pivotal axis.

Since the wound member is thus disposed at the pivoting center of the tip-up frame, which is a position sufficiently away from the ottoman, the length of the traction cable can be made considerably long. Therefore, a large change in the amount of winding of the traction cable can be ensured, with the result that the operation of the locking mechanism can be more securely in conjunction with the movement of the seat cushion.

In the vehicle seat according to the certain embodiment of the present disclosure, in addition to the wound portion, the wound member may include a stem supporting portion provided with a non-circular hole, and a claw-shaped portion having a shape of claw and engaged with the base frame. In this case, the wound member may be fixed to the base frame by engaging the claw-shaped portion with the tip-up frame while positioning the wound member in a peripheral direction by fixing a pin to the base frame and inserting the pin into the non-circular hole with the pin passing through a through hole provided at a position of the tip-up frame corresponding to the first pivotal axis, the pin being provided with a stem portion having a shape corresponding to the non-circular hole provided in the stem supporting portion.

With such a configuration, positioning and fixation of the wound member with respect to the base frame can be greatly facilitated, with the result that operability during an assembly operation is significantly improved.

The vehicle seat according to the certain embodiment of the present disclosure may further include a switching mechanism that switches the seat cushion between a state in which the seat cushion is placed at the seating position and a state in which the seat cushion is placed at the raised position. In this case, the switching mechanism may have a biasing member that biases the tip-up frame with respect to the first pivotal axis in a direction in which the front end portion of the seat cushion is flipped up, and engagement portions for engaging the tip-up frame and the base frame. When the engagement portions are placed at an engagement position at which the engagement portions are engaged, the relative movement of the tip-up frame with respect to the base frame based on biasing force of the biasing member may be restricted to maintain the state in which the seat cushion is placed at the seating position, and when the engagement portions are placed at a non-engagement position at which the engagement portions are not engaged, the relative movement of the tip-up frame with respect to the base frame based on the biasing force of the biasing member may be permitted to move the seat cushion from the seating position to the raised position. Further, in this case, the pin for fixing the wound member to the base frame preferably also serve as a portion of an assembly jig for assembling the switching mechanism to the tip-up frame.

With such a configuration, the wound member can be fixed to the base frame by using the pin serving as a portion of the assembly jig for fixing the switching mechanism to the base frame. Hence, the number of components is reduced and the assembly operation is facilitated.

In the vehicle seat according to the certain embodiment of the present disclosure, the other end of the traction cable is preferably fixed to the wound member.

With such a configuration, the traction cable can be fixed to the base frame with the other end of the traction cable being fixed to the wound member in advance in the assembly operation, thus significantly improving operability in the assembly operation.

In the vehicle seat according to the certain embodiment of the present disclosure, the ottoman may have an ottoman frame that constitutes a skeleton of the ottoman. In this case, the ottoman frame may be pivotably supported by the tip-up frame with respect to a second pivotal axis extending along the seat width direction. Further, in this case, the conjunction mechanism may include a coupling member that couples the ottoman frame and the base frame to each other. When the ottoman frame is pivoted with respect to the second pivotal axis in conjunction with the pivoting of the tip-up frame due to the ottoman frame and the base frame being coupled to each other by the coupling member, the ottoman may be pivoted between the standby position and the stored position.

With such a configuration, the conjunction mechanism for drawing the ottoman more to the seat cushion side when the seat cushion is placed at the raised position and the ottoman is in the retracted state can be realized with a simple configuration.

In the vehicle seat according to the certain embodiment of the present disclosure, the anchoring portion may include a hook member pivotably assembled to the tip-up frame and a hooked portion provided at the ottoman frame. In this case, when the hook member is pivoted by the traction cable due to the one end of the traction cable being connected to the hook member, engagement and disengagement of the hook member with and from the hooked portion are switched to cause the anchoring of the ottoman by the anchoring portion and the canceling of the anchoring.

With such a configuration, the locking mechanism that restricts the relative movement of the ottoman with respect to the seat cushion when the seat cushion is placed at the seating position can be realized with a simple configuration.

The vehicle seat according to the certain embodiment of the present disclosure may further include a seat back having a back rest surface and provided on the base portion. In this case, the seat back is preferably movable relative to the base portion between a back rest position and an inclined position, the back rest position being a position at which the seat back allows for leaning back against the seat back by the back rest surface facing forward, the inclined position being a position at which the seat back is inclined by an upper end portion of the seat back being moved forward and downward from the back rest position. Further, in this case, the seat cushion is preferably configured to be moved from the seating position to the raised position in conjunction with the movement of the seat back from the back rest position to the inclined position.

With such a configuration, since the seat cushion can be placed at the raised position in conjunction with the operation of inclining the seat back, the vehicle seat has more excellent usability while facilitating the vehicle seat to be compact as a whole.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle seat comprising:
a base portion installed on a floor of a vehicle;
a seat cushion having a seating surface and provided on the base portion; and
an ottoman having a leg rest surface and provided at a front end portion of the seat cushion, wherein
the seat cushion is movable relative to the base portion between a seating position and a raised position, the seating position being a position at which the seat cushion allows for seating by the seating surface facing upward, the raised position being a position at which the seat cushion is raised by the front end portion of the seat cushion being flipped up from the seating position,
the ottoman is changeable in shape between a retracted state and an expanded state, the retracted state being a state in which the ottoman is retracted by the ottoman being located on a side opposite to a side on which the seating surface is located when viewed from the seat cushion, the expanded state being a state in which the ottoman is expanded to protrude from the front end portion of the seat cushion by a tip portion of the ottoman being flipped up from the retracted state,
the leg rest surface is provided to face upward when the seat cushion is placed at the seating position and the ottoman is in the expanded state,
the vehicle seat further comprising:
a conjunction mechanism that places the ottoman at a standby position when the seat cushion is placed at the seating position and the ottoman is in the retracted state, and that changes a relative position of the ottoman with respect to the seat cushion in conjunction with movement of the seat cushion so as to place the ottoman at a stored position when the seat cushion is placed at the raised position, the stored position being a position closer to the seating surface relative to the standby position; and
a locking mechanism that permits relative movement of the ottoman with respect to the seat cushion when the seat cushion is not placed at the seating position, and that restricts the relative movement of the ottoman with respect to the seat cushion when the seat cushion is placed at the seating position, wherein
the locking mechanism has an anchoring portion for anchoring the ottoman, a traction cable that has one end connected to the anchoring portion and that has the other end fixed to the base portion, and a wound portion provided with a peripheral surface around which the traction cable is wound, and
the locking mechanism is configured to cause anchoring of the ottoman by the anchoring portion and canceling of the anchoring in response to a change being made in an amount of winding of the traction cable around the wound portion when the seat cushion is moved relative to the base portion.

2. The vehicle seat according to claim 1, wherein
the base portion has a base frame that constitutes a skeleton of the base portion,
the seat cushion has a tip-up frame that constitutes a skeleton of the seat cushion,
the tip-up frame is pivotably supported by the base frame with respect to a first pivotal axis extending along a seat width direction,
the seat cushion is pivoted between the seating position and the raised position by the tip-up frame being pivoted with respect to the first pivotal axis, and a wound member provided with the wound portion is fixed to the base frame so as to be located to be coaxial with the first pivotal axis.

3. The vehicle seat according to claim 2, wherein
in addition to the wound portion, the wound member includes a stem supporting portion provided with a non-circular hole, and a claw-shaped portion having a shape of claw and engaged with the base frame, and
the wound member is fixed to the base frame by engaging the claw-shaped portion with the tip-up frame while positioning the wound member in a peripheral direction by fixing a pin to the base frame and inserting the pin into the non-circular hole with the pin passing through a through hole provided at a position of the tip-up frame corresponding to the first pivotal axis, the pin being provided with a stem portion having a shape corresponding to the non-circular hole provided in the stem supporting portion.

4. The vehicle seat according to claim 3, further comprising a switching mechanism that switches the seat cushion between a state in which the seat cushion is placed at the seating position and a state in which the seat cushion is placed at the raised position, wherein
the switching mechanism has a biasing member that biases the tip-up frame with respect to the first pivotal axis in a direction in which the front end portion of the seat cushion is flipped up, and engagement portions for engaging the tip-up frame and the base frame,
when the engagement portions are placed at an engagement position at which the engagement portions are engaged, the relative movement of the tip-up frame with respect to the base frame based on biasing force of the biasing member is restricted to maintain the state in which the seat cushion is placed at the seating position, and when the engagement portions are placed at a non-engagement position at which the engagement portions are not engaged, the relative movement of the tip-up frame with respect to the base frame based on the biasing force of the biasing member is permitted to move the seat cushion from the seating position to the raised position, and
the pin for fixing the wound member to the base frame also serves as a portion of an assembly jig for assembling the switching mechanism to the tip-up frame.

5. The vehicle seat according to claim 2, wherein the other end of the traction cable is fixed to the wound member.

6. The vehicle seat according to claim 2, wherein
the ottoman has an ottoman frame that constitutes a skeleton of the ottoman,
the ottoman frame is pivotably supported by the tip-up frame with respect to a second pivotal axis extending along the seat width direction,
the conjunction mechanism includes a coupling member that couples the ottoman frame and the base frame to each other, and
when the ottoman frame is pivoted with respect to the second pivotal axis in conjunction with the pivoting of the tip-up frame due to the ottoman frame and the base frame being coupled to each other by the coupling member, the ottoman is pivoted between the standby position and the stored position.

7. The vehicle seat according to claim 6, wherein
the anchoring portion includes a hook member pivotably assembled to the tip-up frame and a hooked portion provided at the ottoman frame, and
when the hook member is pivoted by the traction cable due to the one end of the traction cable being connected to the hook member, engagement and disengagement of the hook member with and from the hooked portion are switched to cause the anchoring of the ottoman by the anchoring portion and the canceling of the anchoring.

8. The vehicle seat according to claim 1, further comprising a seat back having a back rest surface and provided on the base portion, wherein
the seat back is movable relative to the base portion between a back rest position and an inclined position, the back rest position being a position at which the seat back allows for leaning back against the seat back by the back rest surface facing forward, the inclined position being a position at which the seat back is inclined by an upper end portion of the seat back being moved forward and downward from the back rest position, and
the seat cushion is configured to be moved from the seating position to the raised position in conjunction with the movement of the seat back from the back rest position to the inclined position.

* * * * *